United States Patent
Gervais et al.

(10) Patent No.: US 12,020,445 B2
(45) Date of Patent: Jun. 25, 2024

(54) METHOD AND COMPUTING DEVICE USING A NEURAL NETWORK TO LOCALIZE AN OVERLAP BETWEEN TWO THERMAL IMAGES RESPECTIVELY GENERATED BY TWO INFRARED SENSORS

(71) Applicant: Distech Controls Inc., Brossard (CA)

(72) Inventors: Francois Gervais, Lachine (CA); Jean-Simon Boucher, Sainte-Julie (CA); Simon-Pierre Allaire, Brossard (CA); Josh Amelia, Montreal (CA)

(73) Assignee: Distech Controls Inc., Brossard (CA)

( * ) Notice: Subject to any disclaimer, the term of this patent is extended or adjusted under 35 U.S.C. 154(b) by 612 days.

(21) Appl. No.: 17/217,610

(22) Filed: Mar. 30, 2021

(65) Prior Publication Data

US 2022/0319018 A1    Oct. 6, 2022

(51) Int. Cl.
*G06N 3/08*   (2023.01)
*G06N 3/04*   (2023.01)
(Continued)

(52) U.S. Cl.
CPC .............. *G06T 7/248* (2017.01); *G06N 3/04* (2013.01); *G06N 3/08* (2013.01); *G06N 5/04* (2013.01);
(Continued)

(58) Field of Classification Search
CPC ........... G06T 7/248; G06T 2207/10048; G06T 2207/20084; G06T 2207/20081;
(Continued)

(56) References Cited

U.S. PATENT DOCUMENTS 7,995,859 B2 *  8/2011  Hogasten ............... H04N 5/33
                                                  382/275
9,497,380 B1 * 11/2016  Jannard ................. H04N 23/90
(Continued)

FOREIGN PATENT DOCUMENTS

CN       103217221 A  *  7/2013
CN       105318971 A  *  2/2016
(Continued)

*Primary Examiner* — Samir A Ahmed
(74) *Attorney, Agent, or Firm* — Buchanan Ingersoll & Rooney PC

(57) ABSTRACT

A computing device stores a predictive model generated by a neural network training engine. The computing device receives first and second two-dimensional (2D) thermal images comprising temperature measurements from respective first and second infrared (IR) sensors. The first and second images have the same size. An image capturing visual field of the second IR sensor partially overlaps with an image capturing visual field of the first IR sensor. The computing device executes a neural network using a predictive model for generating outputs based on inputs. The inputs comprise the temperature measurements of the first and second images. The outputs comprise horizontal and vertical shifts defining a translation of the second image with respect to the first image. An overlapping area in the first image, having a rectangular shape and overlapping with the second image, is determined using the horizontal and vertical shifts.

10 Claims, 26 Drawing Sheets

(51) Int. Cl.
  *G06N 5/04*    (2023.01)
  *G06T 7/246*   (2017.01)
  *H04N 5/33*    (2023.01)

(52) U.S. Cl.
  CPC .............. *G06T 2207/10048* (2013.01); *G06T 2207/20084* (2013.01); *H04N 5/33* (2013.01)

(58) Field of Classification Search
  CPC .......... G06T 2207/30196; G06T 2207/30232; G06N 3/04; G06N 3/08; G06N 5/04; G06N 3/0464; G06N 3/092; H04N 5/33
  See application file for complete search history.

(56) References Cited

U.S. PATENT DOCUMENTS

| | | |
|---|---|---|
| 10,482,619 B2 | 11/2019 | Ebrahimi Afrouzi et al. |
| 10,788,836 B2 | 9/2020 | Ebrahimi Afrouzi et al. |
| 2009/0257679 A1* | 10/2009 | Hogasten ............ H04N 25/674 382/275 |
| 2020/0034645 A1* | 1/2020 | Fan .................... G06F 18/2413 |
| 2021/0042499 A1* | 2/2021 | Hammad .............. G06F 18/214 |

FOREIGN PATENT DOCUMENTS

| | | | |
|---|---|---|---|
| CN | 110363714 A | * | 10/2019 |
| WO | WO 2020/097130 A1 | * | 5/2020 |

* cited by examiner

METHOD AND COMPUTING DEVICE USING A NEURAL NETWORK TO LOCALIZE AN OVERLAP BETWEEN TWO THERMAL IMAGES RESPECTIVELY GENERATED BY TWO INFRARED SENSORS

TECHNICAL FIELD

The present disclosure relates to the field of image analysis. More specifically, the present disclosure presents a method and computing device using a neural network to localize an overlap between two thermal images respectively generated by two infrared sensors.

BACKGROUND

Systems for controlling environmental conditions, for example in buildings, are becoming increasingly sophisticated. An environment control system may at once control heating and cooling, monitor air quality, detect hazardous conditions such as fire, carbon monoxide release, intrusion, and the like. Such environment control systems generally include at least one environment controller, which receives measured environmental values, generally from sensors, and in turn determines set-points or command parameters to be sent to controlled appliances.

One type of sensor used in the context of environment control systems is an infrared (IR) sensor, such as for example an IR camera. A commonly used output of the IR sensor is a two-dimensional (2D) thermal image, for example in the form of a 2D array of temperature measurements. The temperature measurements generated by the IR sensor may have different applications, such as detecting the presence of a person in a zone, detecting the movement of a person in a zone, counting the number of persons present in a zone, evaluating the body temperature of a person present in the zone, evaluating the external temperature of an object located in the zone, etc. The 2D thermal image generated by the IR sensor is analyzed. The result of the analysis is generally used, in combination with data from other sensors, by an environment controller for controlling operations of one or more controlled appliance.

In order to cover a larger zone, two IR sensors can be used in combination. The two IR sensors are positioned so that two thermal images respectively generated by the two IR sensors can be aligned (e.g. horizontally or vertically), substantially doubling the size of the zone covered. For example, the two IR sensors are affixed to a ceiling of an area of a building, the respective positions of the two IR sensors allowing the alignment of their respective thermal images.

However, an image capturing visual field of the first IR sensor may partially overlap with an image capturing visual field of the second IR sensor, resulting in an overlap their respective thermal images. In this case, combining the two thermal images without taking into consideration the overlap results in a distorted combined image.

Therefore, there is a need for a method and computing device using a neural network to localize an overlap between two thermal images respectively generated by two infrared sensors.

SUMMARY

According to a first aspect, the present disclosure relates to a method using a neural network to localize an overlap between two thermal images respectively generated by two infrared sensors. The method comprises storing in a memory of a computing device a predictive model generated by a neural network training engine. The method comprises receiving, by a processing unit of the computing device via a communication interface of the computing device, a first two-dimensional (2D) thermal image comprising temperature measurements from a first infrared (IR) sensor. The first 2D thermal image has M columns and N rows, M and N being integers. The method comprises receiving, by the processing unit via the communication interface, a second 2D thermal image comprising temperature measurements from a second IR sensor. The second 2D thermal image also has M columns and N rows. An image capturing visual field of the second IR sensor partially overlaps with an image capturing visual field of the first IR sensor. The method comprises executing by the processing unit a neural network inference engine, the neural network inference engine implementing a neural network using the predictive model for generating outputs based on inputs. The inputs comprise the temperature measurements of the first 2D thermal image and the temperature measurements of the second 2D thermal image. The outputs comprise a horizontal shift $S_H$ and a vertical shift $S_V$, the horizontal and vertical shifts being integers. The horizontal and vertical shifts define a translation of the second 2D thermal image with respect to the first 2D thermal image.

According to a second aspect, the present disclosure relates to a computing device. The computing device comprises a communication interface, memory, and a processing unit comprising one or more processor. The memory stores a predictive model generated by a neural network training engine. The processing unit receives via the communication interface a first two-dimensional (2D) thermal image comprising temperature measurements from a first infrared (IR) sensor. The first 2D thermal image has M columns and N rows, M and N being integers. The processing unit receives via the communication interface a second 2D thermal image comprising temperature measurements from a second IR sensor. The second 2D thermal image also has M columns and N rows. An image capturing visual field of the second IR sensor partially overlaps with an image capturing visual field of the first IR sensor. The processing unit executes a neural network inference engine, the neural network inference engine implementing a neural network using the predictive model for generating outputs based on inputs. The inputs comprise the temperature measurements of the first 2D thermal image and the temperature measurements of the second 2D thermal image. The outputs comprise a horizontal shift $S_H$ and a vertical shift $S_V$, the horizontal and vertical shifts being integers. The horizontal and vertical shifts define a translation of the second 2D thermal image with respect to the first 2D thermal image.

In a particular aspect, the processing unit of the computing device further determines an overlapping area in the first 2D thermal image using the horizontal shift $S_H$ and the vertical shift $S_V$. The overlapping area in the first 2D thermal image has a rectangular shape and overlaps with the second 2D thermal image.

In another particular aspect, the processing unit of the computing device further combines the first 2D thermal image with the second 2D thermal image, taking into consideration the overlapping area.

According to a third aspect, the present disclosure relates to a method using a neural network to localize an overlap between two images respectively generated by two imaging sensors. The method comprises storing in a memory of a computing device a predictive model generated by a neural network training engine. The method comprises receiving by a processing unit of the computing device a first image of dimensions D comprising pixel values from a first imaging sensor, D being equal to 2 or 3. The method comprises receiving by the processing unit a second image also of dimensions D comprising pixel values from a second imaging sensor. Each dimension of the second image has the same size as the corresponding dimension of the first image. An image capturing visual field of the second imaging sensor partially overlaps with an image capturing visual field of the first imaging sensor. The method comprises executing by the processing unit a neural network inference engine, the neural network inference engine implementing a neural network using the predictive model for generating outputs based on inputs. The inputs comprise the pixel values of the first image and the pixel values of the second image. The outputs comprise D shift values, each shift value being an integer defining a translation of the second image with respect to the first image in one among the D dimensions.

BRIEF DESCRIPTION OF THE DRAWINGS

Embodiments of the disclosure will be described by way of example only with reference to the accompanying drawings, in which.

DETAILED DESCRIPTION

Figure 1:
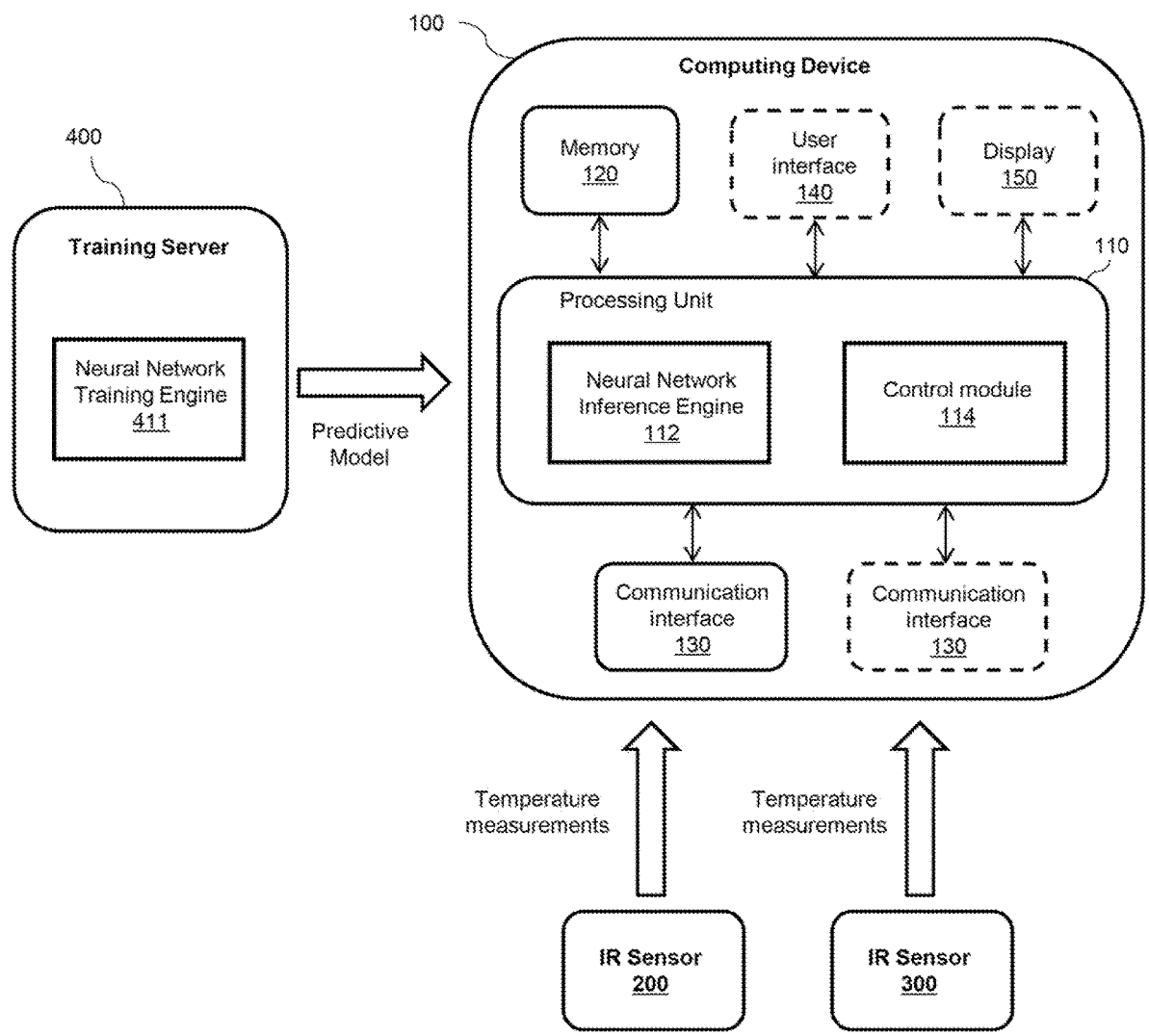
FIG. 1 illustrates an environment control system comprising a computing device and two infrared (IR) sensors.

The foregoing and other features will become more apparent upon reading of the following non-restrictive description of illustrative embodiments thereof, given by way of example only with reference to the accompanying drawings.

Various aspects of the present disclosure generally address one or more of the problems related to the analysis of images generated by imaging sensors (for instance in the context of environment control systems for buildings). More particularly, the present disclosure aims at providing solutions for determining the position of an overlapping zone between two images generated by two imaging sensors. The present disclosure mainly focuses on two-dimensional (2D) infrared (IR) images generated by IR sensors. However, a generalization to three-dimensional (3D) images and the generation of the images by any type of imaging sensor is also provided. The detected overlapping zone has a rectangular shape for 2D images and a 3-dimensional shape for 3D images.

The following terminology is used throughout the present specification:

Environment: condition(s) (temperature, pressure, oxygen level, light level, security, etc.) prevailing in a controlled zone or place, such as for example in a building.

Environment control system: a set of components which collaborate for monitoring and controlling an environment.

Environmental data: any data (e.g. information, commands) related to an environment that may be exchanged between components of an environment control system.

Environment control device (ECD): generic name for a component of an environment control system. An ECD may consist of an environment controller, a sensor, a controlled appliance, etc.

Environment controller: device capable of receiving information related to an environment and sending commands based on such information.

Environmental characteristic: measurable, quantifiable or verifiable property of an environment (a building). The environmental characteristic comprises any of the following: temperature, pressure, humidity, lighting, CO2, flow, radiation, water level, speed, sound; a variation of at least one of the following, temperature, pressure, humidity and lighting, CO2 levels, flows, radiations, water levels, speed, sound levels, etc., and/or a combination thereof.

Environmental characteristic value: numerical, qualitative or verifiable representation of an environmental characteristic.

Sensor: device that detects an environmental characteristic and provides a numerical, quantitative or verifiable representation thereof. The numerical, quantitative or verifiable representation may be sent to an environment controller.

Controlled appliance: device that receives a command and executes the command. The command may be received from an environment controller.

Environmental state: a current condition of an environment based on an environmental characteristic, each environmental state may comprise a range of values or verifiable representation for the corresponding environmental characteristic.

VAV appliance: a Variable Air Volume appliance is a type of heating, ventilating, and/or air-conditioning (HVAC) system. By contrast to a Constant Air Volume (CAV) appliance, which supplies a constant airflow at a variable temperature, a VAV appliance varies the airflow at a constant temperature.

Zone of a building: the expression 'zone of a building' is used throughout the present specification to refer to the interior of a whole building or a portion of the interior of the building such as, without limitation: a floor, a room, an aisle, etc.

Figure 2:
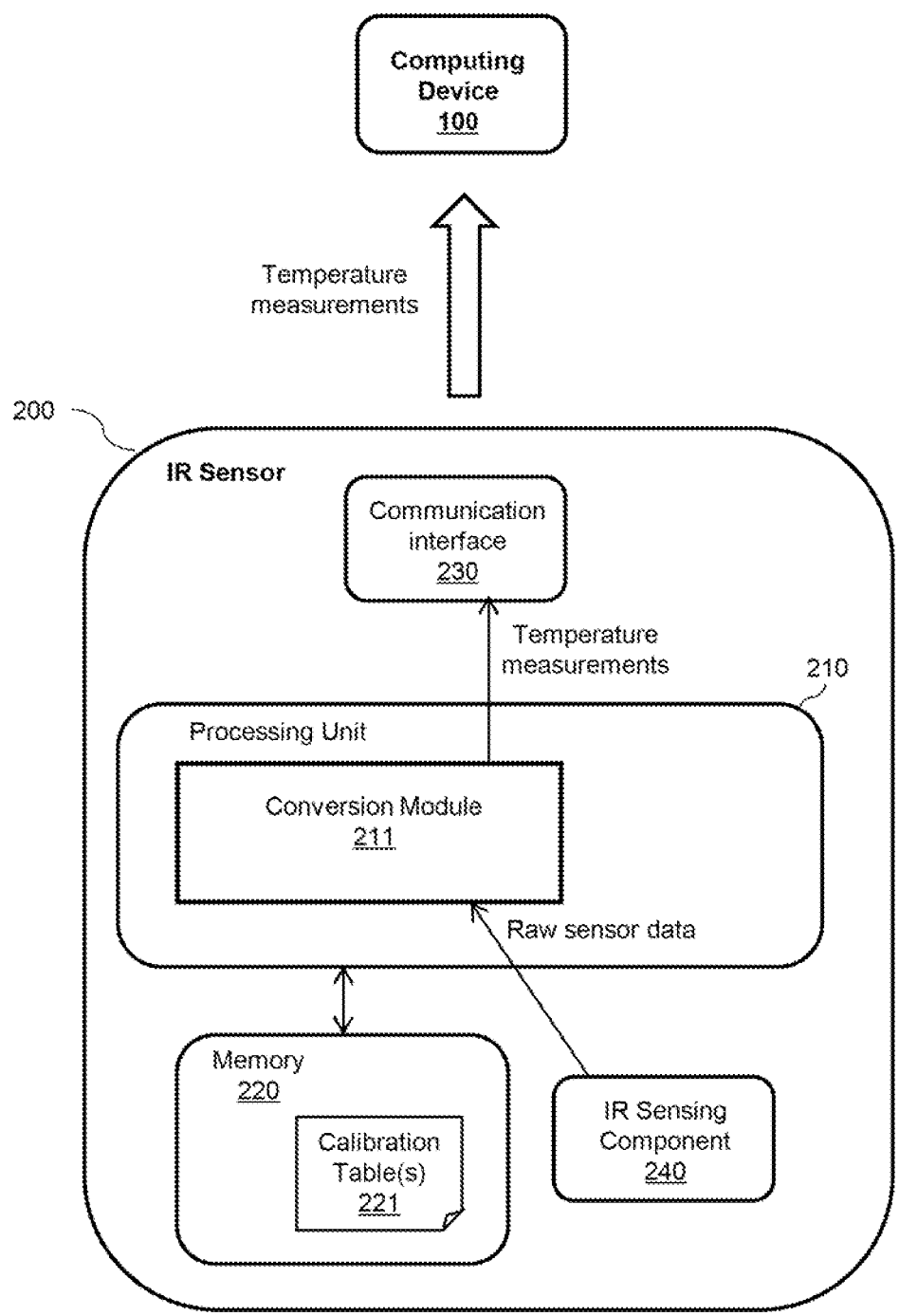
FIG. 2 provides a detailed representation of the IR sensors of FIG. 1.
Figure 3:
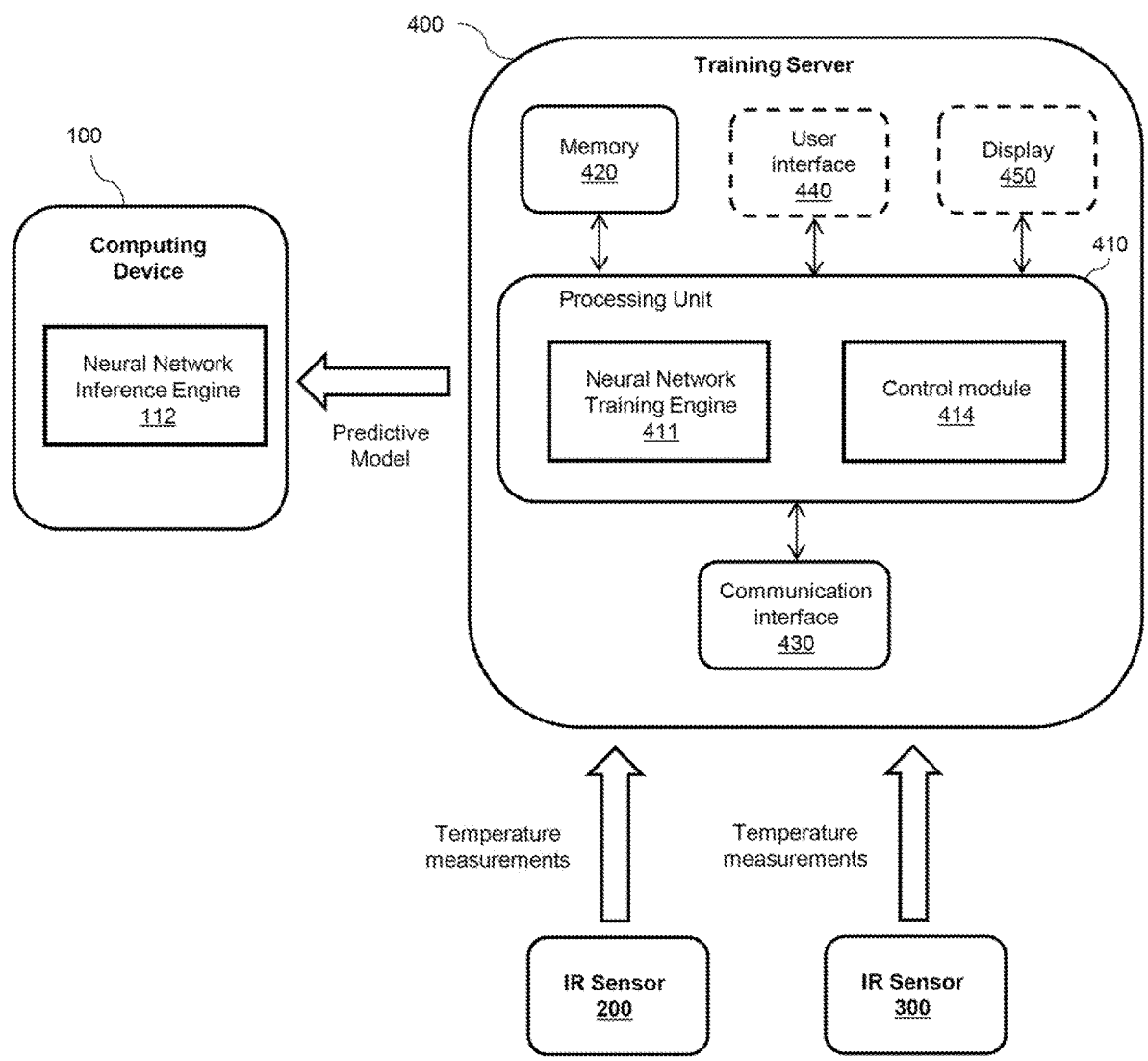
FIG. 3 provides a detailed representation of a training server represented in FIG. 1.

Referring now to FIGS. 1, 2 and 3, an environment control system comprising a computing device 100 is illustrated. For example, the computing device 100 is an environment controller 100 exchanging data with other environment control devices (ECDs). The environment controller 100 is responsible for controlling the environment of a zone of a building. The environment controller 100 receives from sensors (e.g. from the infrared (IR) sensors 200 and 300) environmental characteristic values measured by the sensors. The environment controller 100 generates commands based on the received environmental characteristic values. The generated commands are transmitted to controlled appliances (not represented in the Figures for simplification purposes), to control operations of the controlled appliances.

The zone under the control of the computing device 100 is not represented in the Figures for simplification purposes. As mentioned previously, the zone may consist of a room, a floor, an aisle, etc. However, any type of zone located inside any type of building is considered being within the scope of the present disclosure.

Details of the computing device 100, the IR sensor 200 and the training server 400 will now be provided.

As illustrated in FIG. 1, the computing device 100 comprises a processing unit 110, memory 120, and a communication interface 130. The computing device 100 may comprise additional components, such as another communication interface 130, a user interface 140, a display 150, etc.

The processing unit 110 comprises one or more processor (not represented in the Figures) capable of executing instructions of a computer program. Each processor may further comprise one or several cores. The processing unit 110 executes a neural network inference engine 112 and a control module 114, as will be detailed later in the description.

The memory 120 stores instructions of computer program(s) executed by the processing unit 110 (for implementing the neural network inference engine 112, the control module 114, etc.), data generated by the execution of the computer program(s), data received via the communication interface 130 (or another communication interface), etc. Only a single memory 120 is represented in FIG. 1, but the environment controller 100 may comprise several types of memories, including volatile memory (such as a volatile Random Access Memory (RAM), etc.) and non-volatile memory (such as a hard drive, electrically-erasable programmable read-only memory (EEPROM), flash, etc.).

The communication interface 130 allows the computing device 100 to exchange data with remote devices (e.g. with the IR sensors 200 and 300, controlled appliance(s), a training server 400, etc.) over a communication network (not represented in FIG. 1 for simplification purposes). For example, the communication network is a wired communication network, such as an Ethernet network; and the communication interface 130 is adapted to support communication protocols used to exchange data over the Ethernet network. Other types of wired communication networks may also be supported by the communication interface 130. In another example, the communication network is a wireless communication network, such as a Wi-Fi network; and the communication interface 130 is adapted to support communication protocols used to exchange data over the Wi-Fi network. Other types of wireless communication network may also be supported by the communication interface 130, such as a wireless mesh network, Bluetooth®, Bluetooth® Low Energy (BLE), etc. In still another example, the environment controller 100 comprises two communication interfaces 130. The environment controller 100 communicates with the IR sensors (200 and 300) and controlled appliance(s) via a first communication interface 130 (e.g. a Wi-Fi interface); and communicates with other devices (e.g. the training server 400) via a second communication interface 130 (e.g. an Ethernet interface). Each communication interface 130 usually comprises a combination of hardware and software executed by the hardware, for implementing the communication functionalities of the communication interface 130.

As illustrated in FIG. 2, the IR sensor 200 comprises a processing unit 210, memory 220, a communication interface 230 and an IR sensing component 240. The IR sensor 200 may comprise additional components not represented in the Figures. An example of IR sensor 200 consists of an IR camera. However, other types of IR sensor may be used in place of an IR camera. Although not represented in the Figures for simplification purposes, the components of the IR sensor 300 are similar to the components of the IR sensor 200 represented in FIG. 2.

The processing unit 210 of the IR sensor 200 is similar to the processing unit 110 of the computing device 100. The processing unit 210 executes a conversion module 211, as will be detailed later in the description.

The memory 220 of the IR sensor 200 is similar to the memory 120 of the computing device 100. The memory 220 stores instructions of computer program(s) executed by the processing unit 210 for implementing the conversion module 211, etc. The memory 220 also stores calibration table(s) 221, which will be detailed later in the description.

The communication interface 230 of the IR sensor 200 is similar to the communication interface 130 of the computing device 100. The communication interface 230 allows the IR sensor 200 to exchange data with remote devices (e.g. with the computing device 100, etc.) over a communication network (not represented in FIG. 2 for simplification purposes). The communication interface 230 is generally a wireless communication interface, such as a Wi-Fi interface.

The IR sensing component 240 is well known in the art of IR sensors. The IR sensing component 240 generates raw sensor data. The conversion module 211 executed by the processing unit 210 is a software implementing a conversion algorithm. The conversion algorithm uses the calibration table(s) 221 to convert the raw sensor data into corresponding temperature measurements. The raw sensor data may be pre-processed before processing by the conversion algorithm.

For example, in the case of a low end IR camera, the IR sensing component 240 performs thermographic IR imaging, which consists in detecting radiations in the electromagnetic spectrum with wavelengths in the range of substantially 900 to 14 000 nanometers. The IR sensing component 240 implements a thermal detector which collects heat energy. The thermal detector produces a signal voltage proportional to the collected heat energy. The signal voltage is converted into a digital count by an Analog to Digital (A/D) converter. The A/D converter (not represented in FIG. 2 for simplification purposes) may be integrated to the IR sensing component 240 or to the processing unit 210. In this exemplary implementation, the raw sensor data represented in FIG. 2 consist of the digital counts, which are integers encoded on a given number of bits (e.g. 14 bits providing a range of values of 0 to 16383). The conversion algorithm converts each digital count into a corresponding temperature measurement, using the calibration table(s) 221. The details of how the conversion algorithm and the calibration table(s) 221 are implemented are out of the scope of the present disclosure. The conversion algorithm generally operates in two steps. In a first step, the digital count is converted into a radiance value. In a second step, the radiance value is converted into the temperature measurement, using a known or measured emissivity value of the target object (or person) which temperature is measured. FIG. 2 illustrates the aforementioned process, where the conversion module 211 converts the raw sensor data into temperature measurements, which are transmitted to the computing device 100.

As mentioned previously, the present disclosure addresses IR sensors 200 which generate a thermal image. The thermal image is a two-dimensional (2D) image, for example in the form of a 2D array of temperature measurements. The conversion module 211 receives a 2D array of raw sensor data, comprising M columns and N rows (for example, M is equal to 24 and N is equal to 32), as follows:

$$[R_{1,1} R_{2,1} \ldots R_{M,1}$$
$$R_{1,2} R_{2,2} \ldots R_{M,2}$$
$$\ldots$$
$$R_{1,N} R_{2,N} \ldots R_{M,N}]$$

The conversion module 211 generates a 2D array of temperature measurements, comprising M columns and N rows, as follows:

$$[T_{1,1} T_{2,1} \ldots T_{M,1}$$
$$T_{1,2} T_{2,2} \ldots T_{M,2}$$
$$\ldots$$
$$T_{1,N} T_{2,N} \ldots T_{M,N}]$$

Each value of the array of raw sensor data is representative of heat energy collected by the IR sensing component 240. Each corresponding value $T_{i,j}$ of the array of temperature measurements is calculated by applying the calibration table(s) 221 to the value of $R_{i,j}$.

The former description of an exemplary implementation of the IR sensor 200 is for illustration purposes only. Any IR sensor capable of generating a thermal image representative of temperature measurements in two dimensions is relevant to the present disclosure. The temperature measurements are transmitted via the communication interface 230 of the IR sensor 200. In the rest of the disclosure, the temperature measurements generated and transmitted by the IR sensor 200 will be referred to as a thermal image. The data structure representative of the thermal image may vary from one implementation of IR sensor to another. For example, the data structure representative of the thermal image is the aforementioned 2D array of temperature measurements. However, other data structures may be used for representing the thermal image.

As illustrated in FIG. 3, the training server 400 comprises a processing unit 410, memory 420 and a communication interface 430. The training server 400 may comprise additional components, such as a user interface 440, a display 450, etc.

The processing unit 410 of the training server 400 is similar to the processing unit 110 of the computing device 100. The processing unit 410 executes a neural network training engine 411 and a control module 414, as will be detailed later in the description.

The memory 420 of the training server 400 is similar to the memory 120 of the computing device 100. The memory 420 stores instructions of computer program(s) executed by the processing unit 410 for implementing the neural network training engine 411, the control module 414, etc.

The communication interface 430 of the training server 400 is similar to the communication 130 of the computing device 100. The communication interface 430 allows the training server 400 to exchange data with remote devices (e.g. with the computing device 100, etc.) over a communication network (not represented in FIG. 3 for simplification purposes).

The execution of the neural network training engine 411 generates a predictive model of a neural network, which is transmitted to the computing device 100 via the communication interface of the training server 400. The predictive model is transmitted over a communication network and received via the communication interface 130 of the computing device 100.

Reference is now made concurrently to FIGS. 4A-4L.

Figure 4A:
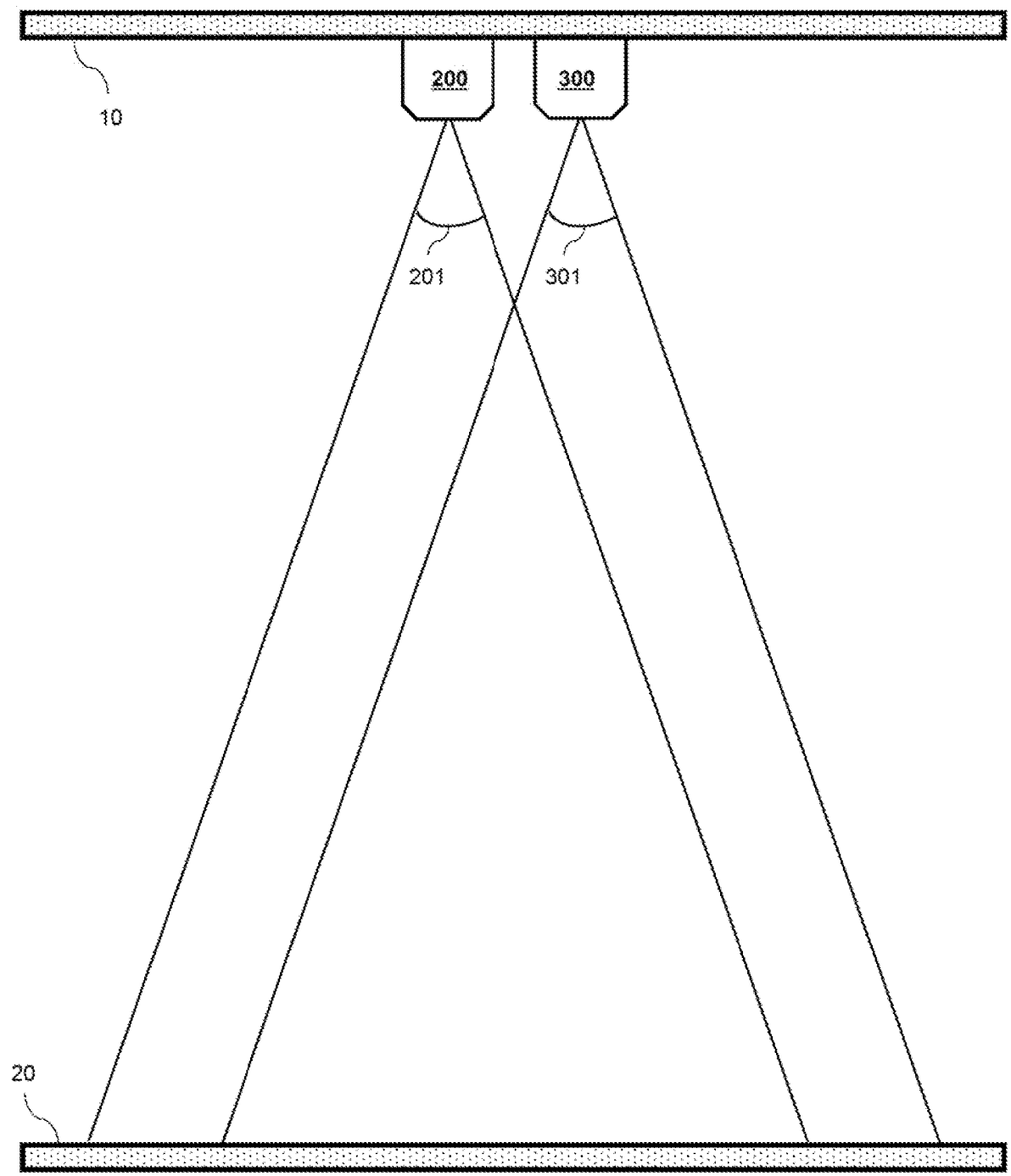
FIGS. 4A and 4B represent the two IR sensors of FIG. 1 having partially overlapping image capturing visual fields.
Figure 4B:
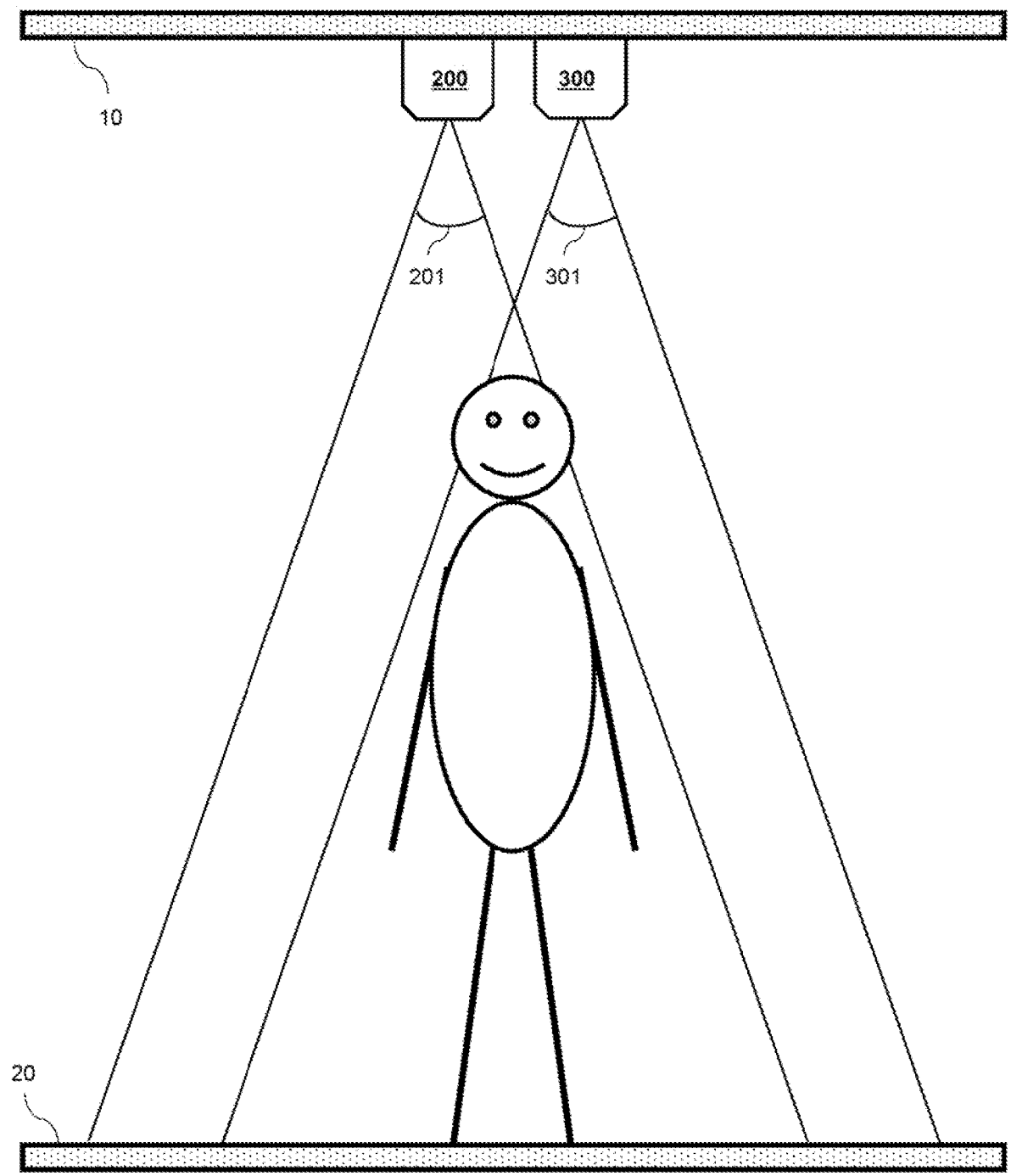

FIGS. 4A and 4B represent a zone of a building where the IR sensors 200 and 300 are deployed. For simplification purposes, only the ceiling 10 and the floor 20 of the zone of the building are illustrated in FIGS. 4A and 4B. The IR sensors 200 and 300 are affixed to the ceiling 10. An image capturing visual field 201 of the IR sensor 200 partially overlaps with an image capturing visual field 301 of the IR sensor 300. Consequently, there is an overlap between a thermal image generated by the IR sensor 200 and a thermal image generated by the IR sensor 300. In the configuration illustrated in FIGS. 4A and 4B, the IR sensors 200 and 300 are positioned substantially in the same plane. Any other deployment configuration of the IR sensors 200 and 300 involving an overlap between their respective image capturing visual fields 201 and 301 is relevant in the context of the present disclosure. For instance, the IR sensors 200 and 300 may be positioned at different heights.

In FIG. 4B, a human being 30 is represented in the zone of the building. The human being 30 is in a position covered by the respective image capturing visual fields 201 and 301 of the IR sensors 200 and 300.

Figure 4C:
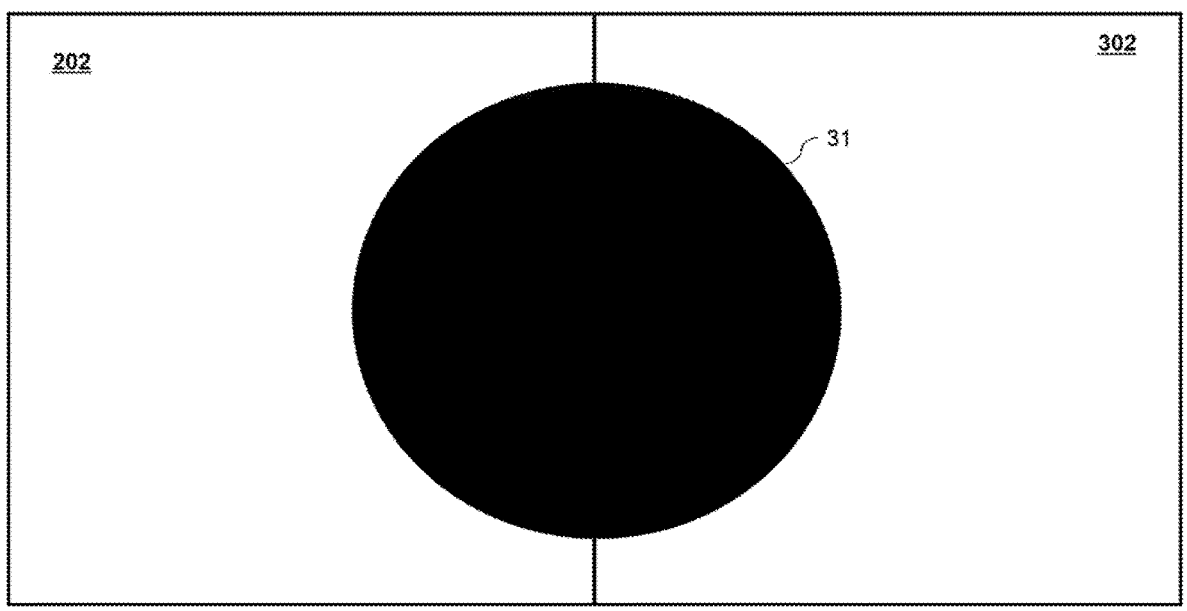
FIG. 4C represents the alignment of two images having no overlapping area.

FIG. 4C represents hypothetical thermal images 202 and 302 respectively generated by the IR sensors 200 and 300 if the IR sensors 200 and 300 were positioned to generate perfectly aligned thermal images without overlap. In this ideal case, the hypothetical thermal images 202 and 302 are combined to generate a combined thermal image comprising a non-distorted representation 31 of the human being 30. The combination is performed by aligning horizontally the hypothetical thermal images 202 and 302.

Figure 4D:
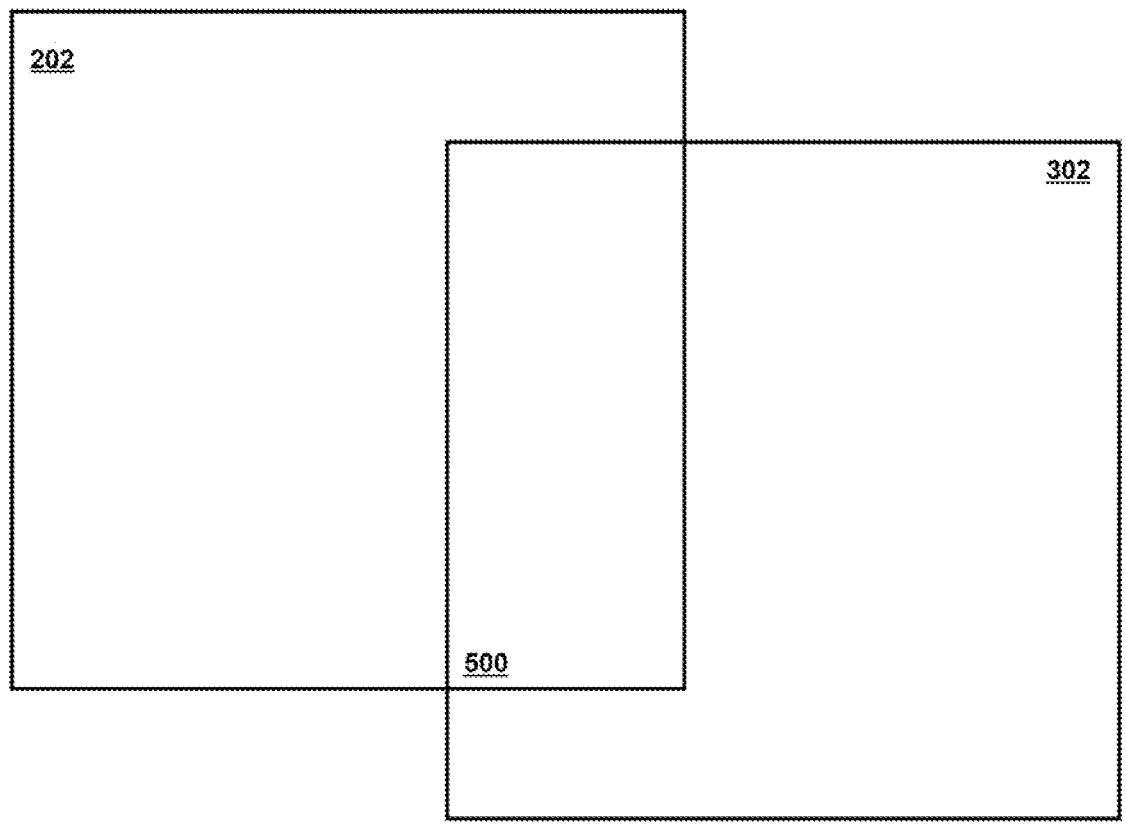
FIGS. 4D to 4L represent steps of the alignment of two images having an overlapping area.

FIG. 4D represents thermal images 202 and 302 respectively generated by the IR sensors 200 and 300 when the IR sensors 200 and 300 have partially overlapping image capturing visual field 201 and 301, as illustrated in FIGS. 4A and 4B. The thermal images 202 and 302 have an overlapping area 500.

Figure 4E:
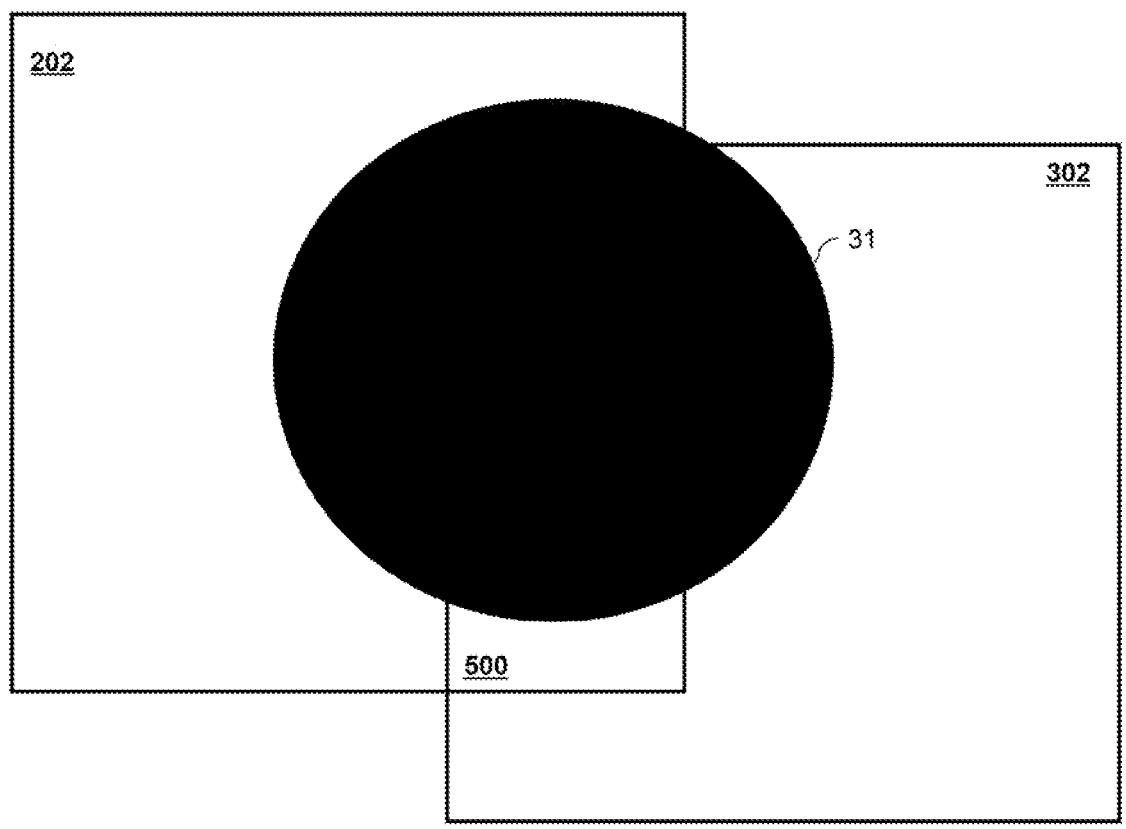

FIG. 4E represents the position of the non-distorted representation 31 (illustrated in FIG. 4C) of the human being 30 with respect to the thermal images 202, 302 and the overlapping area 500 (illustrated in FIG. 4D).

Figure 4F:
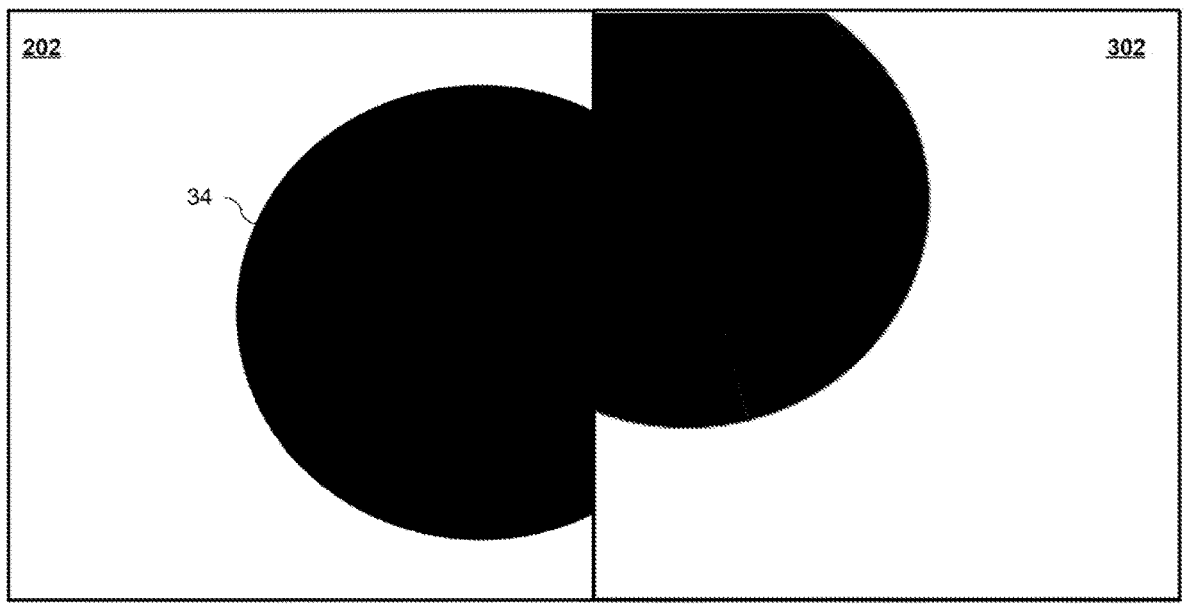

FIG. 4F represents a combination of the thermal images 202 and 302 (illustrated in FIG. 4E) to generate a combined thermal image. The combination is performed by aligning horizontally the thermal images 202 and 302, without taking into consideration the overlapping area 500 (illustrated in FIG. 4D) between the thermal images 202 and 302. The combined thermal image comprises a distorted representation 34 of the human being 30. In order to avoid a distortion of the representation 34 of the human being 30, the overlapping area 500 needs to be taken into consideration when performing the combination of the thermal images 202 and 302, as illustrated in the following.

Figure 4G:
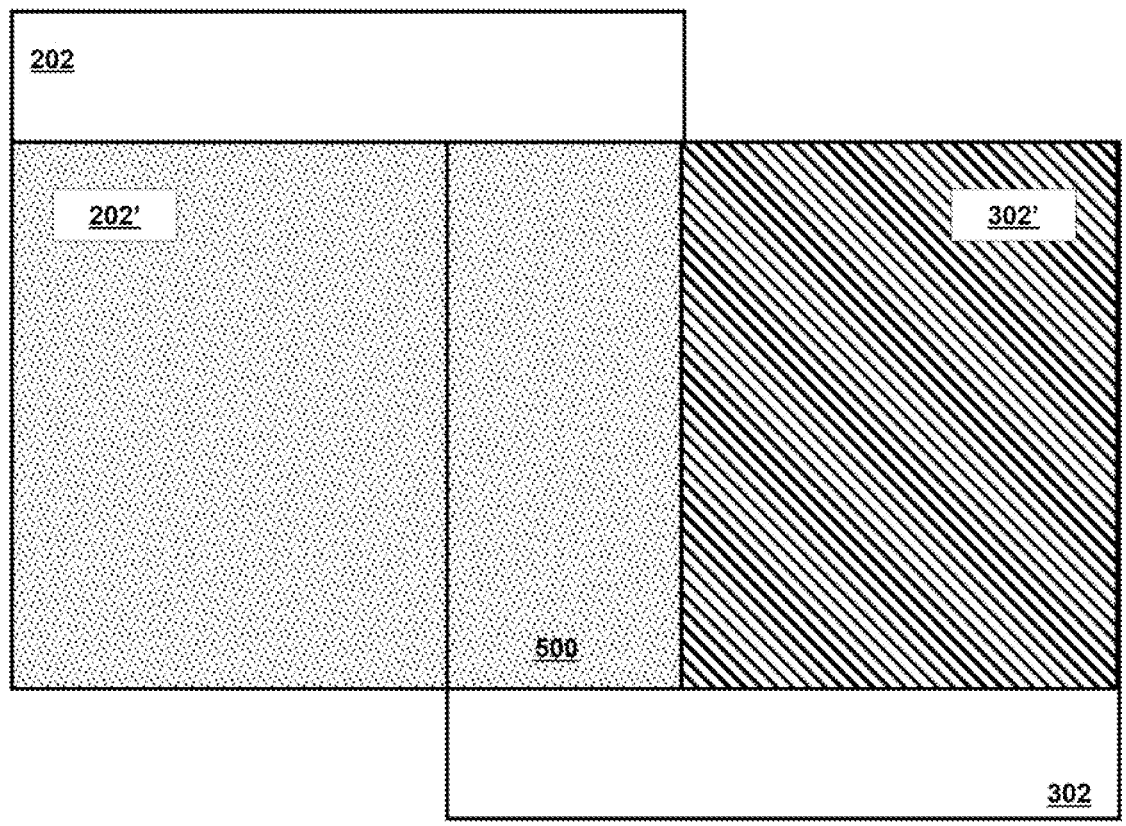

FIG. 4G represents the thermal images 202, 302 and the overlapping area 500 (illustrated in FIG. 4D). A thermal image 202' comprising the overlapping area 500 is extracted from the thermal image 202. An upper part of thermal image 202 is not included in thermal image 202'. A thermal image 302' not comprising the overlapping area 500 is extracted from the thermal image 302. A lower part of thermal image 302 is not included in thermal image 302'.

Figure 4H:
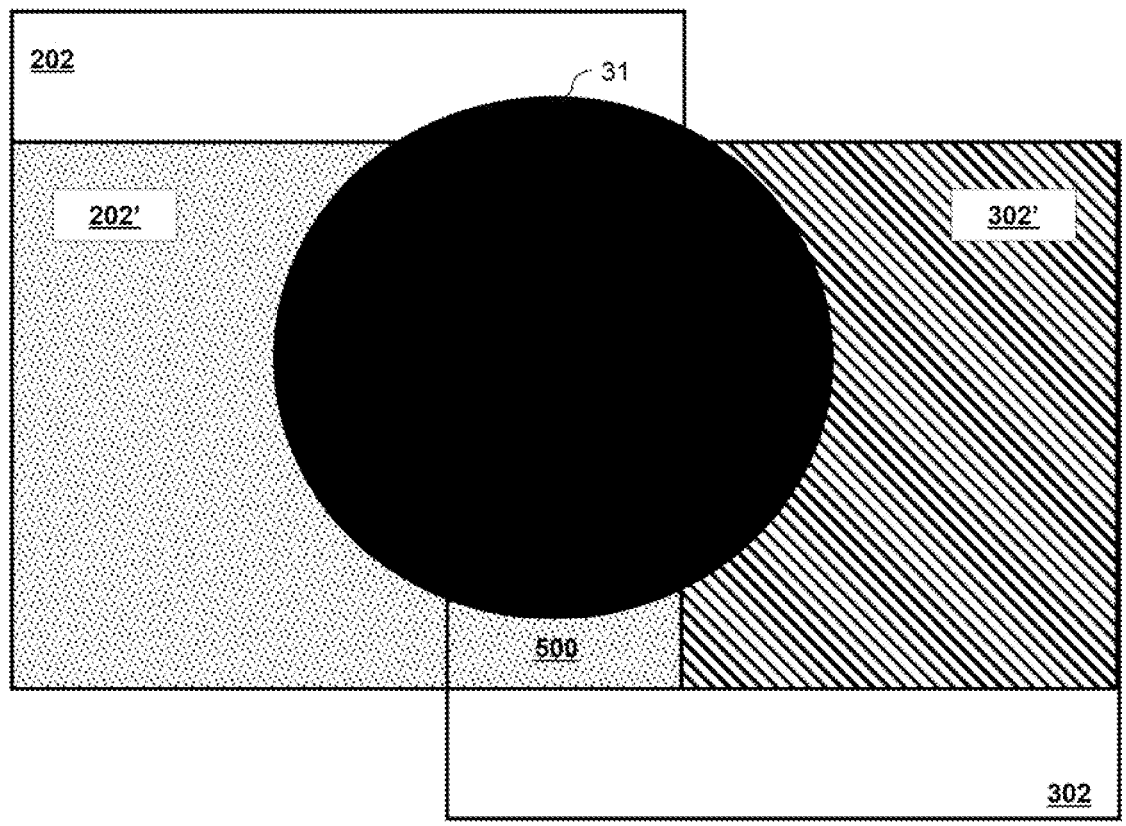

FIG. 4H represents the position of the non-distorted representation 31 (illustrated in FIG. 4C) of the human being 30 with respect to the thermal images 202' and 302'.

Figure 4I:
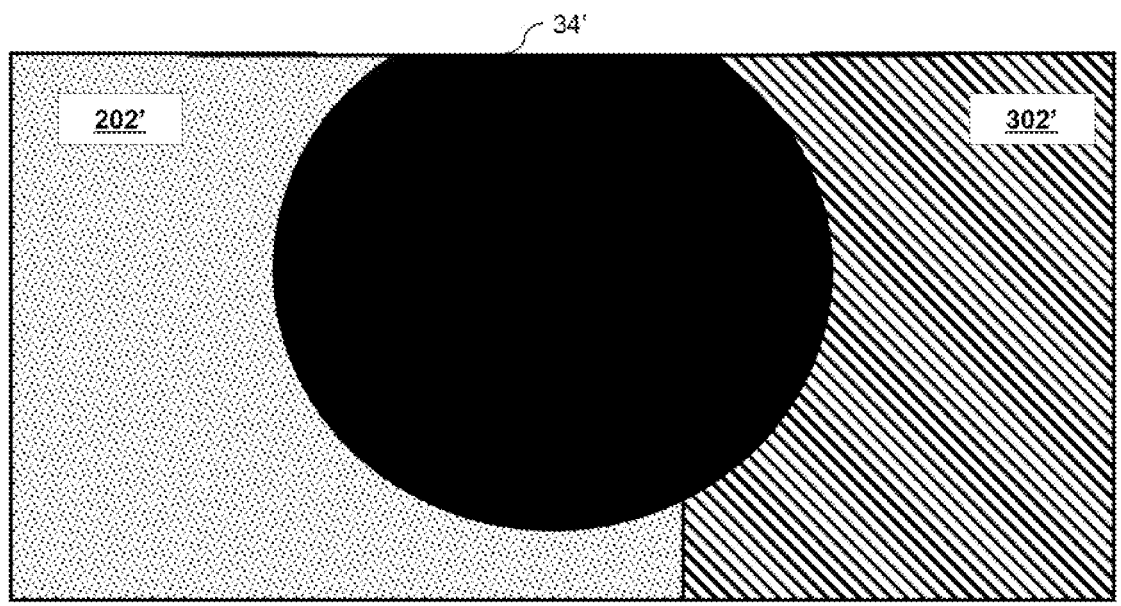

FIG. 4I represents a combination of the thermal images 202' and 302' (illustrated in FIG. 4H) to generate a combined thermal image. The combination is performed by aligning horizontally the thermal images 202' and 302'. The combined thermal image comprises a non-distorted representation 34' of the human being 30. By comparison to FIG. 4F, distortion in the representation of the human being 30 is avoided, because the overlapping area 500 (illustrated in FIGS. 4D and 4G) is taken into consideration.

However, by comparison to FIG. 4C which provides an ideal representation of the of the human being 30, the representation 34' of the human being 30 is incomplete. Following is another implementation of the thermal images 202' and 302', designed to minimize the loss of information in the representation of the human being 30.

Figure 4J:
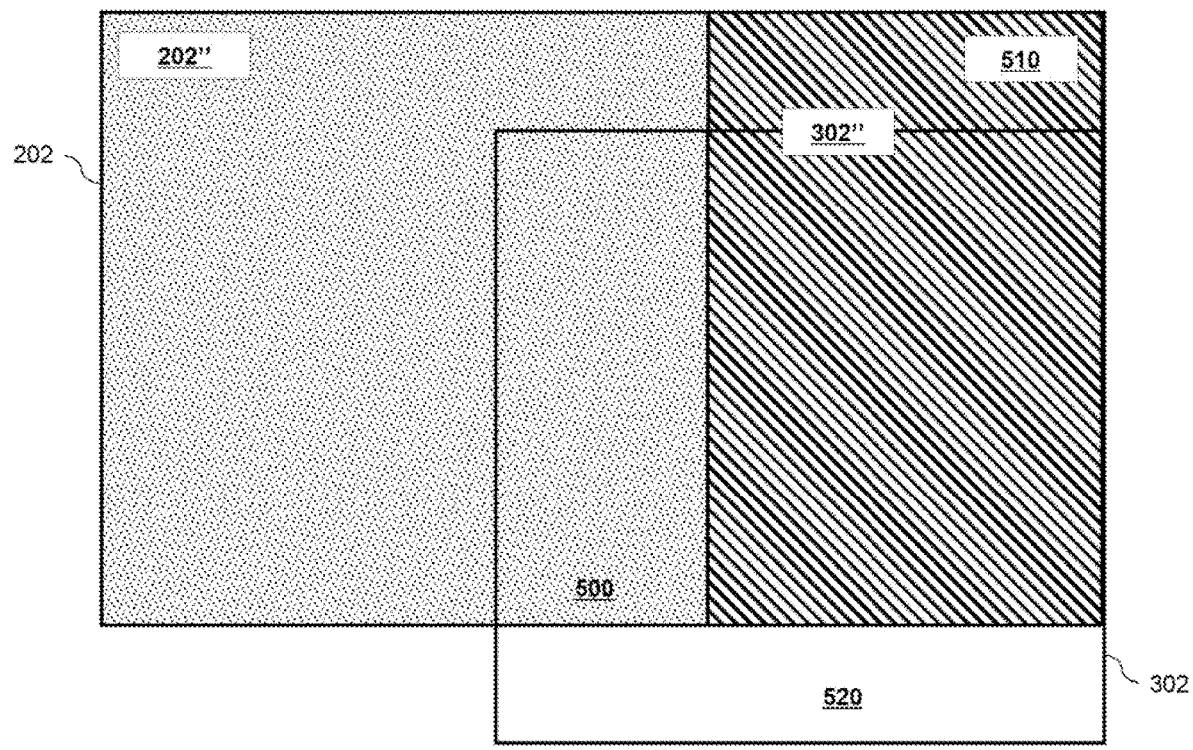

FIG. 4J represents the thermal images 202, 302 and the overlapping area 500 (illustrated in FIG. 4D). A thermal image 202" corresponds exactly to the thermal image 202, consequently including the overlapping area 500. A thermal image 302" comprises a portion of the thermal image 302, excluding the overlapping area 500. The thermal image 302" comprises an extension area 510 not included in the original thermal image 302. As illustrated in FIG. 4J, the extension area 510 constitutes an upper portion of the thermal image 302". A bottom portion 520 of the original thermal image 302 is not included in the thermal image 302". The extension area 510 is generated with a background color corresponding to a background temperature of the zone of the building (e.g. 20 degrees Celsius). The thermal image 302" is designed for being horizontally aligned with the thermal image 202" (consisting of the original thermal image 202).

Figure 4K:
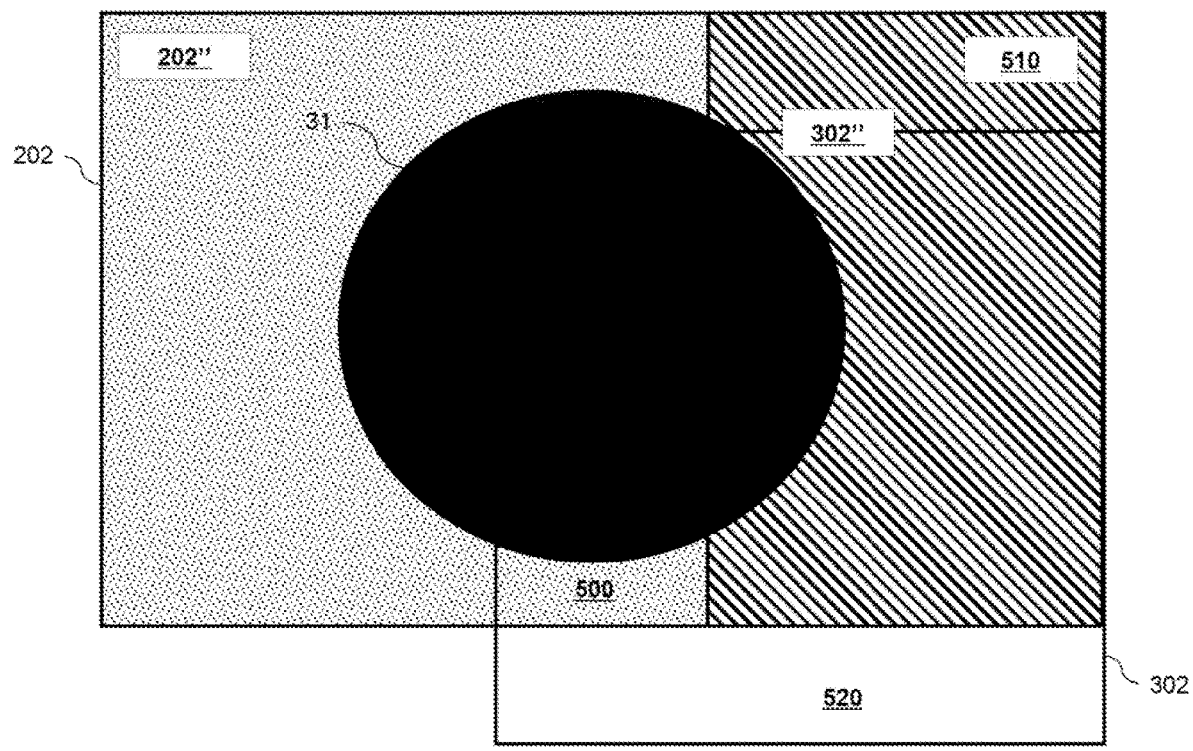

FIG. 4K represents the position of the non-distorted representation 31 (illustrated in FIG. 4C) of the human being 30 with respect to the thermal images 202" and 302".

Figure 4L:
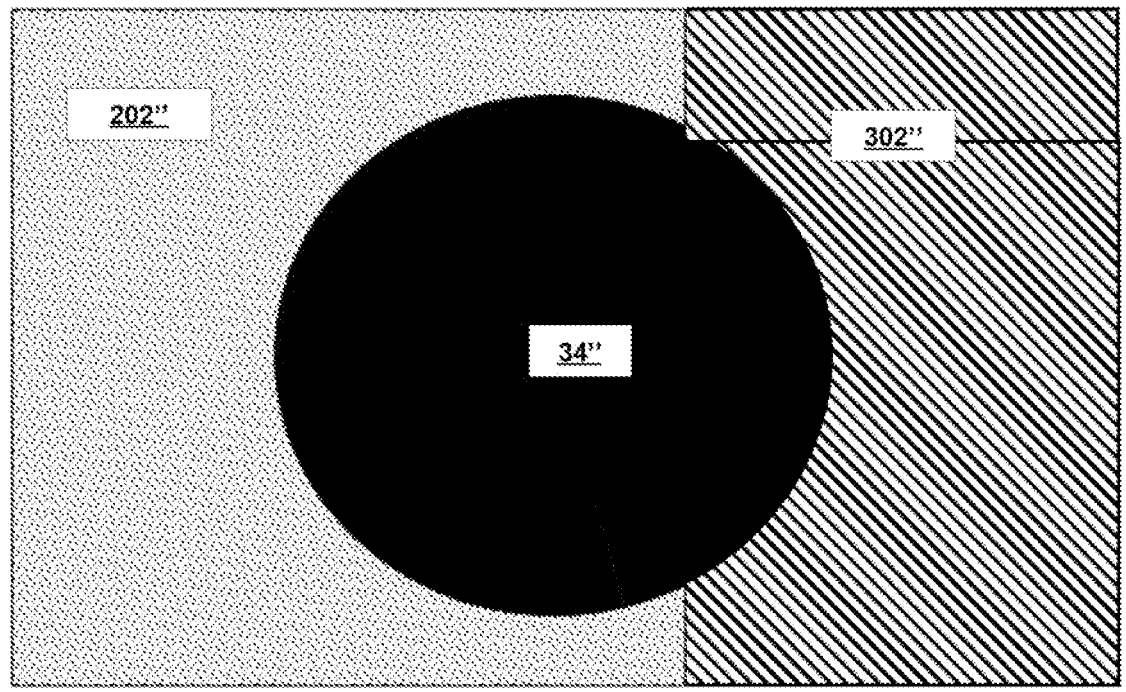

FIG. 4L represents a combination of the thermal images 202" and 302" (illustrated in FIG. 4K) to generate a combined thermal image. The combination is performed by aligning horizontally the thermal images 202" and 302". The combined thermal image comprises a non-distorted representation 34" of the human being 30. By comparison to FIG. 4F, distortion in the representation of the human being 30 is avoided, because the overlapping area 500 (illustrated in FIGS. 4D and 4J) is taken into consideration.

Furthermore, by comparison to FIG. 4I, the loss of information in the representation of the human being 30 has been minimized (through the respective designs of the thermal images 202" and 302").

Reference is now made concurrently to FIGS. 5A-5E.

Figure 5A:
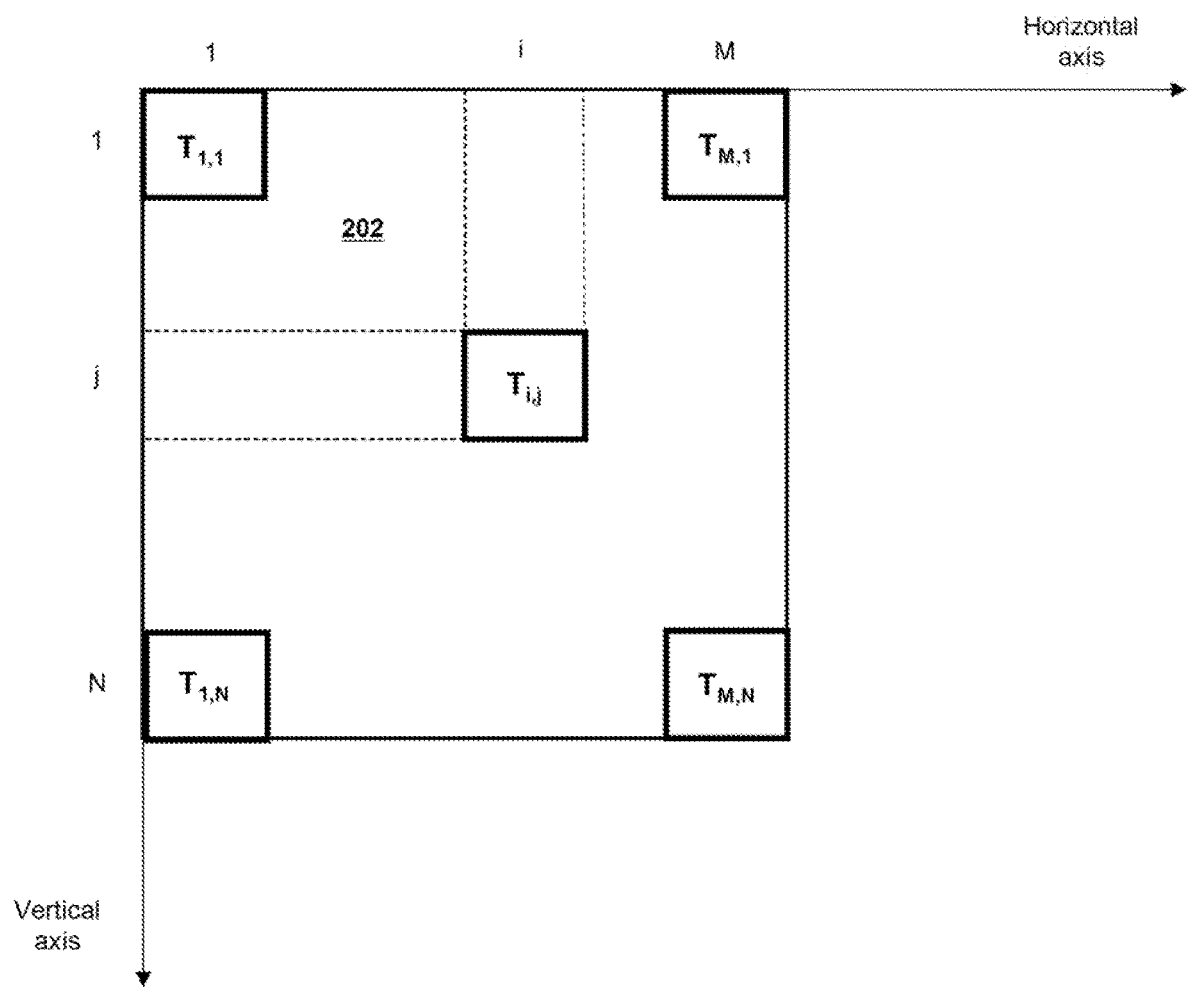
FIG. 5A is a visual representation of a first thermal image.

FIG. 5A represents the thermal image 202 in a form corresponding to the previously mentioned 2D array of temperature measurements, comprising M columns and N rows, as follows:

$$[T_{1,1} T_{2,1} \ldots T_{M,1}$$
$$T_{1,2} T_{2,2} \ldots T_{M,2}$$
$$\ldots$$
$$T_{1,N} T_{2,N} \ldots T_{M,N}]$$

A thermal image is usually represented with pixels, each pixel having a color representative of the associated temperature measurement. However, for illustration purposes, the thermal image 202 is represented in FIG. 5A as a set of squares instead of a set of pixels, each square representing an element of the 2D array of temperature measurements. The horizontal axis and the vertical axis in FIG. 5A respectively correspond to the columns and rows of the 2D array of temperature measurements. For example, the square corresponding to the temperature measurement $T_{i,j}$ is at position i on the horizontal axis and position j on the vertical axis. The 2D array of temperature measurements comprising M columns and N rows, the representation of the thermal image 202 extends on the horizontal axis from position 1 to M and extends on the vertical axis from position 1 to N.

FIGS. 5B to 5E represent the thermal images 202 and 302, and their overlapping area 500. The overlapping area 500 is defined by a horizontal shift $S_H$ and a vertical shift $S_V$, the horizontal and vertical shifts being integers which can take positive and negative values.

A reference element (square or pixel) of the thermal image 202 is selected and the corresponding reference element in the thermal image 302 is identified. The horizontal shift $S_H$ and the vertical shift $S_V$ determine a shift between the position of the reference element in the thermal image 202 and the position of the corresponding reference element in the thermal image 302. Any reference element of the thermal image 202 may be used. For illustration purposes, in FIGS. 5B-F, the reference element of the thermal image 202 corresponds to column 1 and line 1 of the 2D array of temperature measurements.

Figure 5B:
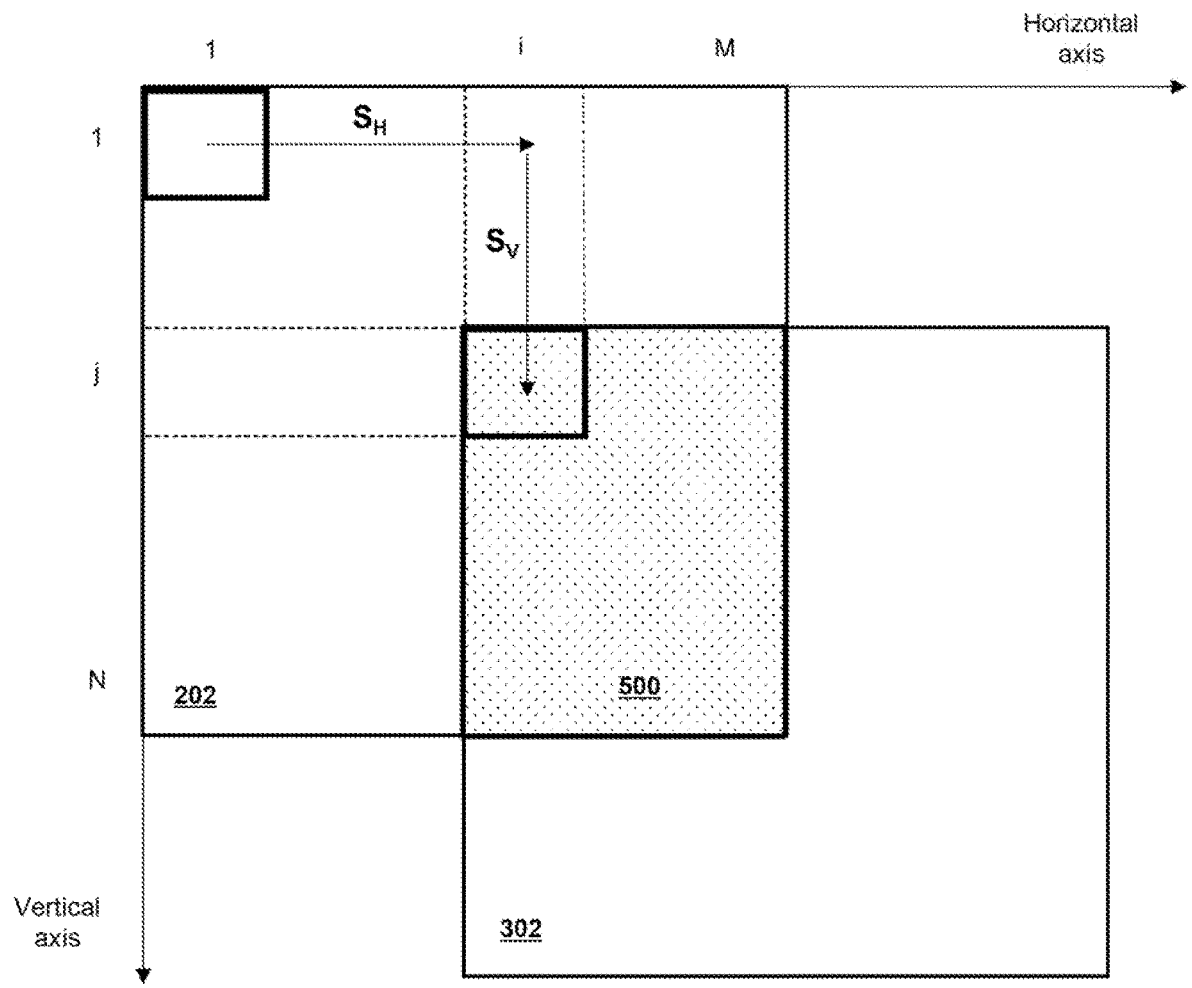
FIGS. 5B to 5E illustrate a localization of an overlap between the first thermal image represented in FIG. 5A and a second thermal image.

FIG. 5B illustrates a configuration with positive values for the horizontal shift $S_H$ and the vertical shift $S_V$. The corresponding reference element in the thermal image 302 is located at column i and line j of the thermal image 202. The horizontal shift $S_H$ is equal to i−1 and the vertical shift $S_V$ is equal to j−1. With respect to the thermal image 202, the overlapping area 500 extends from column i ($S_H$+1) to column M and from row j ($S_V$+1) to row N.

Figure 5C:
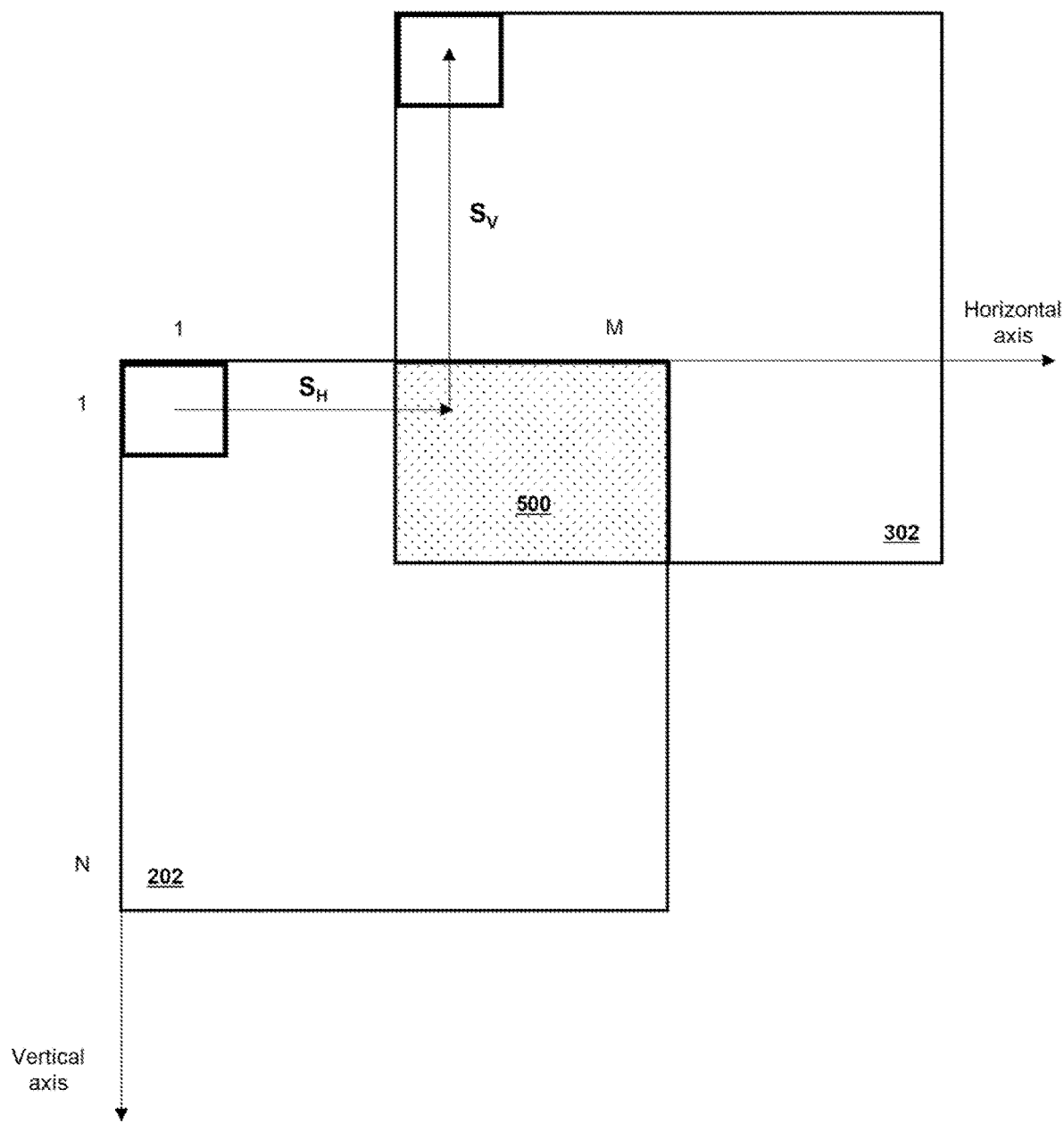

FIG. 5C illustrates a configuration with a positive value for the horizontal shift $S_H$ and a negative value for the vertical shift $S_V$. With respect to the thermal image 202, the overlapping area 500 extends from column ($S_H$+1) to column M and from row 1 to row (N+$S_V$).

Figure 5D:
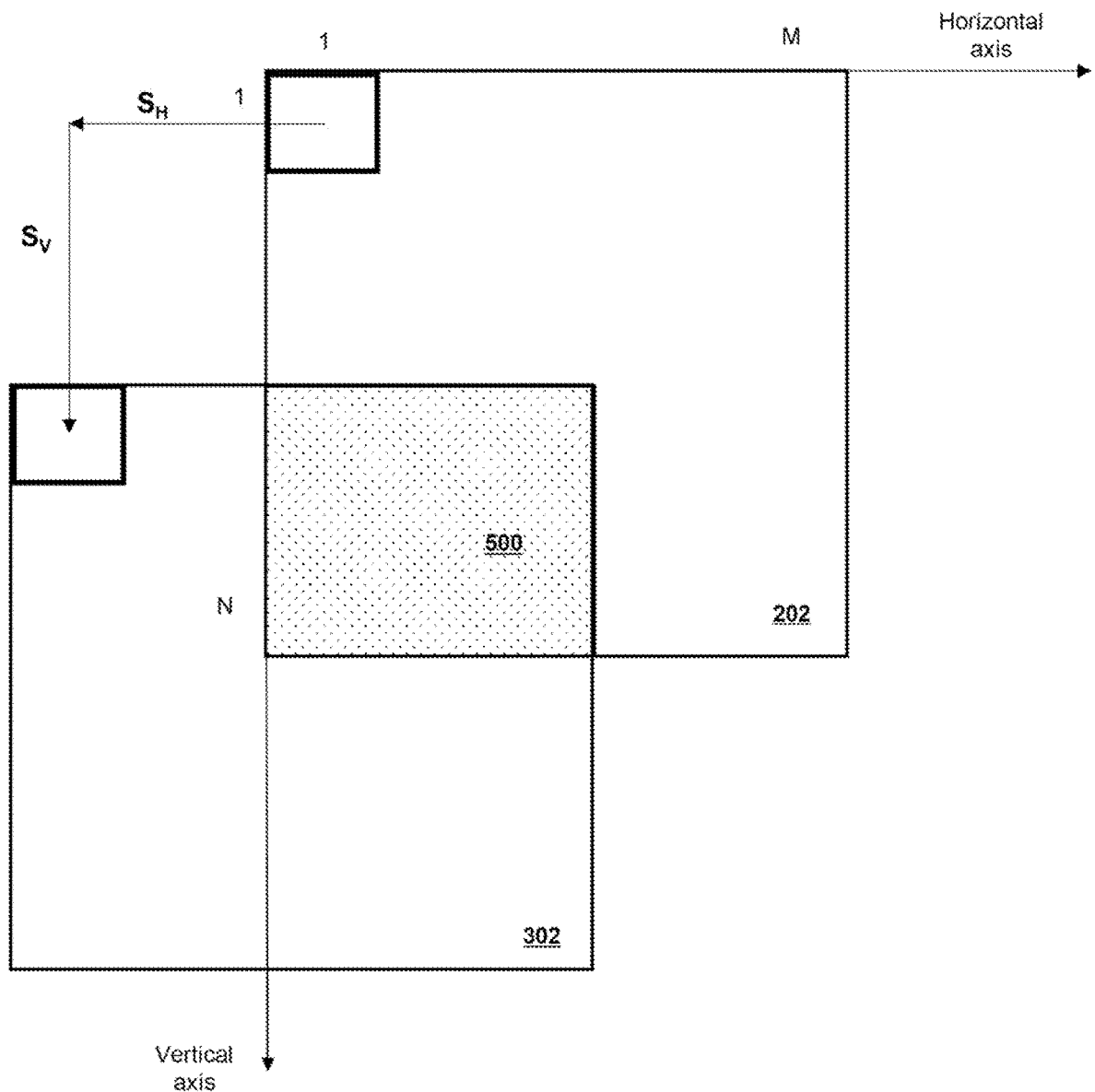

FIG. 5D illustrates a configuration with a negative value for the horizontal shift $S_H$ and a positive value for the vertical shift $S_V$. With respect to the thermal image 202, the overlapping area 500 extends from column 1 to column (M+$S_H$) and from row ($S_V$+1) to row N.

Figure 5E:
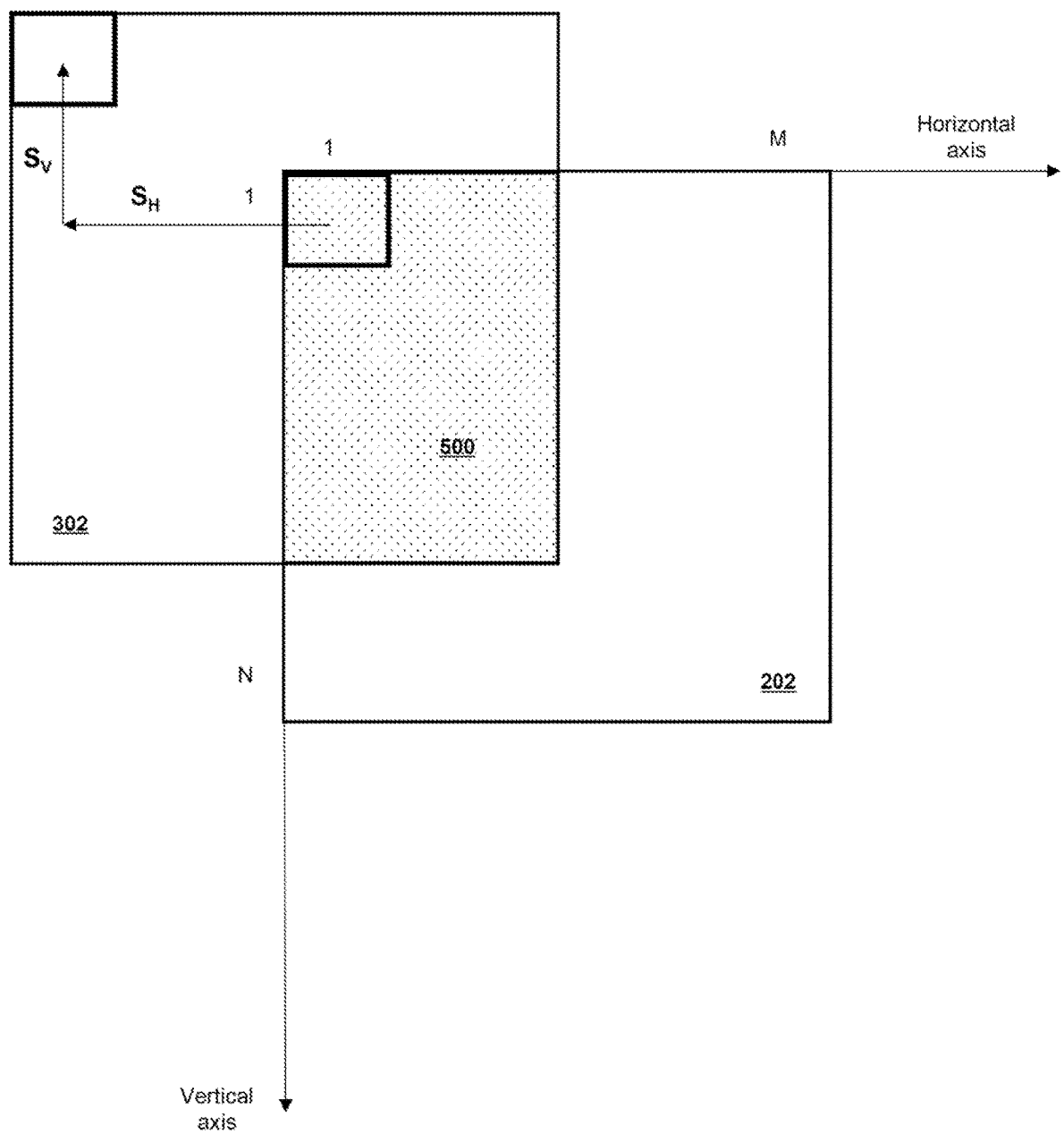

FIG. 5E illustrates a configuration with negative values for the horizontal shift $S_H$ and the vertical shift $S_V$. With respect to the thermal image 202, the overlapping area 500 extends from column 1 to column (M+$S_H$) and from row 1 to row (N+$S_V$).

The implementation illustrated in FIGS. 5A-E is based on a reference system where the horizontal and vertical axis respectively extend from 1 to M and 1 to N. A person skilled in the art would readily adapt this implementation to another reference system, for example a reference system where the horizontal and vertical axis respectively extend from 0 to (M−1) and 0 to (N−1). In any of these reference systems, the value of the horizontal shift $S_H$ and the vertical shift $S_V$ does not change. However, the determination of the extension of the overlapping area 500 based on the values of the horizontal shift $S_H$ and vertical shift $S_V$ need to be adapted to the reference system.

As will be detailed in the following, a neural network is trained to determine the values of the horizontal shift $S_H$ and vertical shift $S_V$ when presented with thermal images 202 and 302 comprising the overlapping area 500.

Figure 6:
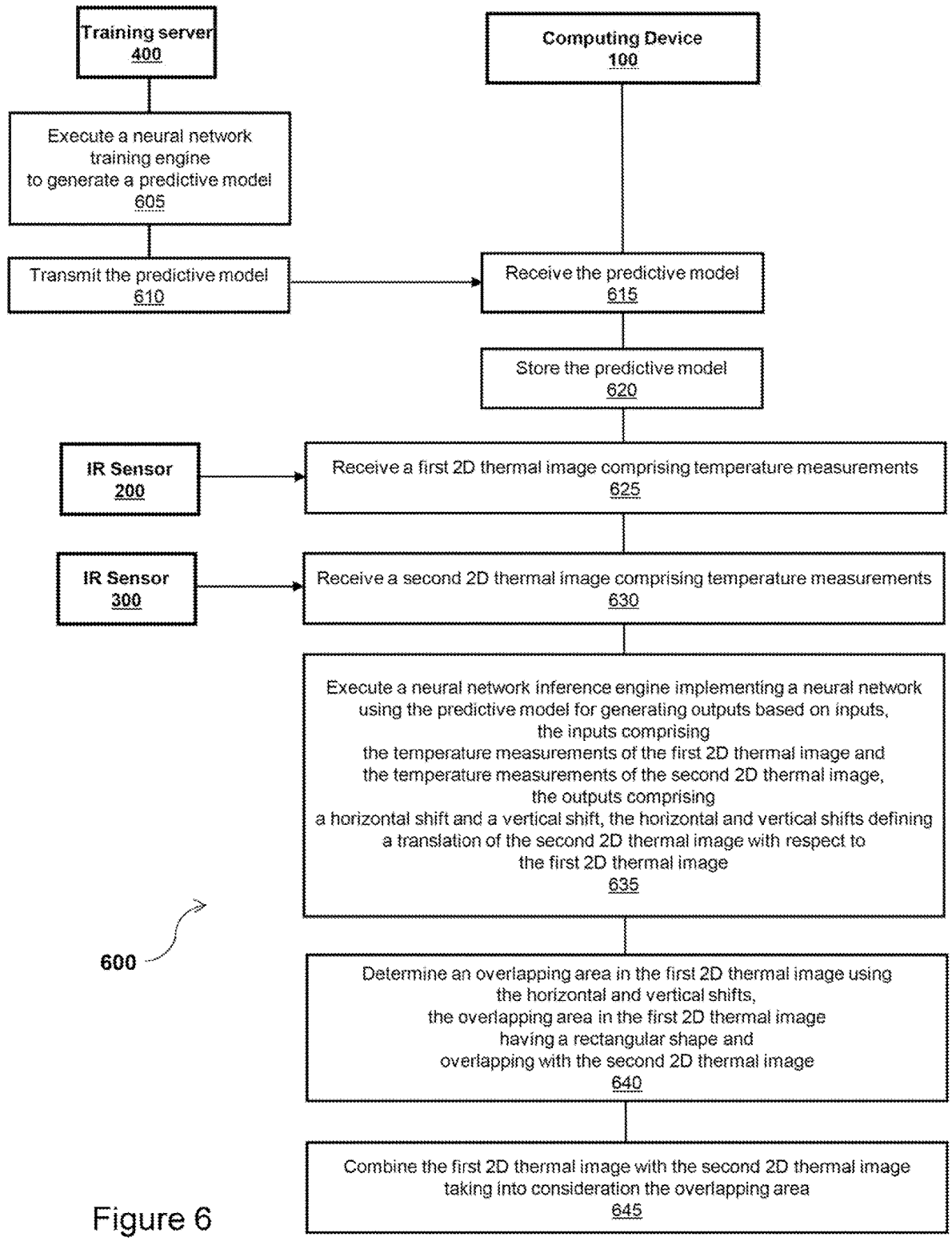
FIG. 6 illustrates a method implemented by the computing device of FIG. 1, using a neural network to localize an overlap between two thermal images respectively generated by the two infrared sensors of FIG. 1.

Reference is now made concurrently to FIGS. 1, 2, 3 and 6; where FIG. 6 represents a method 600 using a neural network to localize an overlap between two thermal images respectively generated by two infrared sensors. At least some of the steps of the method 600 are implemented by the computing device 100. The present disclosure is not limited to the method 600 being implemented by the computing device 100 represented in FIG. 1, but is applicable to any type of computing device capable of implementing the steps of the method 600.

A dedicated computer program has instructions for implementing at least some of the steps of the method 600. The instructions are comprised in a non-transitory computer program product (e.g. the memory 120) of the computing device 100. The instructions provide for using a neural network to localize an overlap between two thermal images respectively generated by two infrared sensors, when executed by the processing unit 110 of the computing device 100. The instructions are deliverable to the computing device 100 via an electronically-readable media such as a storage media (e.g. CD-ROM, USB key, etc.), or via communication links (e.g. via a communication network through the communication interface 130).

The instructions of the dedicated computer program executed by the processing unit 110 implement the neural network inference engine 112 and the control module 114. The neural network inference engine 112 provides functionalities of a neural network, allowing to infer outputs based on inputs using the predictive model (generated by the training server 400), as is well known in the art. The control module 114 provides functionalities allowing the computing device 100 to interact with and control other devices (e.g. the IR sensors 200 and 300, the training server 400, etc.).

The method 600 comprises the step 605 of executing the neural network training engine 411 to generate the predictive model. Step 605 is performed by the processing unit 410 of the training server 400. The predictive model comprises parameters of a neural network implemented by the neural network training engine 411. This step will be further detailed later in the description.

The method 600 comprises the step 610 of transmitting the predictive model generated at step 605 to the computing device 100, via the communication interface 430 of the training server 400. Step 610 is performed by the processing unit 410 of the training server 400.

The method 600 comprises the step 615 of receiving the predictive model from the training server 400, via the communication interface 130 of the computing device 100. Step 615 is performed by the processing unit 110 of the computing device 100.

The method 600 comprises the step 620 of storing the predictive model in the memory 120 of the computing device 100. Step 620 is performed by the processing unit 110 of the computing device 100.

The method 600 comprises the step 625 of receiving a first 2D thermal image comprising temperature measurements (e.g. thermal image 202 illustrated in FIGS. 4D and 5B-E) from the IR sensor 200, via the communication interface 130 of the computing device 100. Step 625 is performed by the processing unit 110 of the computing device 100. As mentioned previously, the first 2D thermal image comprises M columns and N rows, M and N being integers.

The method 600 comprises the step 630 of receiving a second 2D thermal image comprising temperature measurements (e.g. thermal image 302 illustrated in FIGS. 4D and 5B-E) from the IR sensor 300, via the communication interface 130 of the computing device 100. Step 630 is performed by the processing unit 110 of the computing device 100. As mentioned previously, the second 2D thermal image also comprises M columns and N rows.

As mentioned previously and illustrated in FIGS. 4A and 4B, the image capturing visual field 301 of the IR sensor 300 partially overlaps with the image capturing visual field 201 of the IR sensor 200.

A digital representation of the first and second 2D thermal images may vary, based on a particular implementation of the IR sensors 200 and 300. In a previously mentioned implementation, the 2D thermal images transmitted by the IR sensors 200 and 300 to the computing device 100 are in the form of respective 2D arrays of temperature measurements. In another implementation, the data structure representative of the 2D thermal images is not in the form of a 2D array of temperature measurements. For example, the data structure is a vector comprising M*N entries, which may be converted into a 2D array of temperature measurements by the processing unit 110.

The method 600 comprises the step 635 of executing the neural network inference engine 112. The neural network inference engine 112 implements a neural network using the predictive model (stored at step 620) for generating outputs based on inputs. The execution of the neural network inference engine 112 is performed by the processing unit 110 of the computing device 100. This step will be further detailed later in the description.

The inputs comprise the temperature measurements of the first 2D thermal image (received at step 625) and the temperature measurements of the second 2D thermal image (received at step 630). Optionally, the inputs also include additional input value(s) not represented in FIG. 6 for simplification purposes. During the training phase, the predictive model generated by the neural network training engine 411 takes into account the additional input value(s) if applicable.

The outputs comprise a horizontal shift $S_H$ and a vertical shift $S_V$, the horizontal and vertical shifts being integers, the horizontal and vertical shifts defining a translation of the second 2D thermal image with respect to the first 2D thermal image (as illustrated in FIGS. 5B-E).

Depending on a frame rate of the IR sensors 200 and 300, all the images received from the IR sensors 200 and 300 are used at step 635, or only a subset of the images received from the IR sensors 200 and 300 is used at step 635 (if the frame rate is too high).

The first and second 2D thermal images used as inputs need to be substantially synchronized for the method 600 to operate properly. For example, the IR sensors 200 and 300 are synchronized. Alternatively, the thermal images generated by the IR sensors 200 and 300 have timestamps, and the first and second 2D thermal images used as inputs have substantially the same timestamp. In yet another use case, the frame rate of the IR sensors 200 and 300 is high enough for synchronization not to be an issue.

The method 600 comprises the step 640 of determining an overlapping area (e.g. 500 in FIGS. 5B-E) in the first 2D thermal image using the horizontal shift $S_H$ and the vertical shift $S_V$, the overlapping area in the first 2D thermal image having a rectangular shape and overlapping with the second 2D thermal image. Step 640 is performed by the processing unit 110 of the computing device 100. The determination of the overlapping area has been described previously in relation to FIGS. 5B-E.

The method 600 comprises the step 645 of combining the first 2D thermal image with the second 2D thermal image, taking into consideration the overlapping area determined at step 640. Step 645 is performed by the processing unit 110 of the computing device 100. Two exemplary implementations of the combination of the first and second thermal images, taking into consideration their overlapping area, has been described previously in relation to FIGS. 4G-L.

At least some of the steps 615, 620, 625, 630, 640 and 645 of the method 600 are performed by the control module 114 executed by the processing unit 110. Additional steps not represented in FIG. 6 may be performed by the control module 114. For example, the combined image generated at step 645 is analyzed (by an image processing software, which may include a neural network) to determine if a person is present in the combined image. Based on the determination of whether a person is present or not in the combined image, the control module 114 may generate command(s) for controlling controlled appliance(s), generates alarms, sends notifications to user(s), displays notifications on the display 150, etc.

Figure 7:
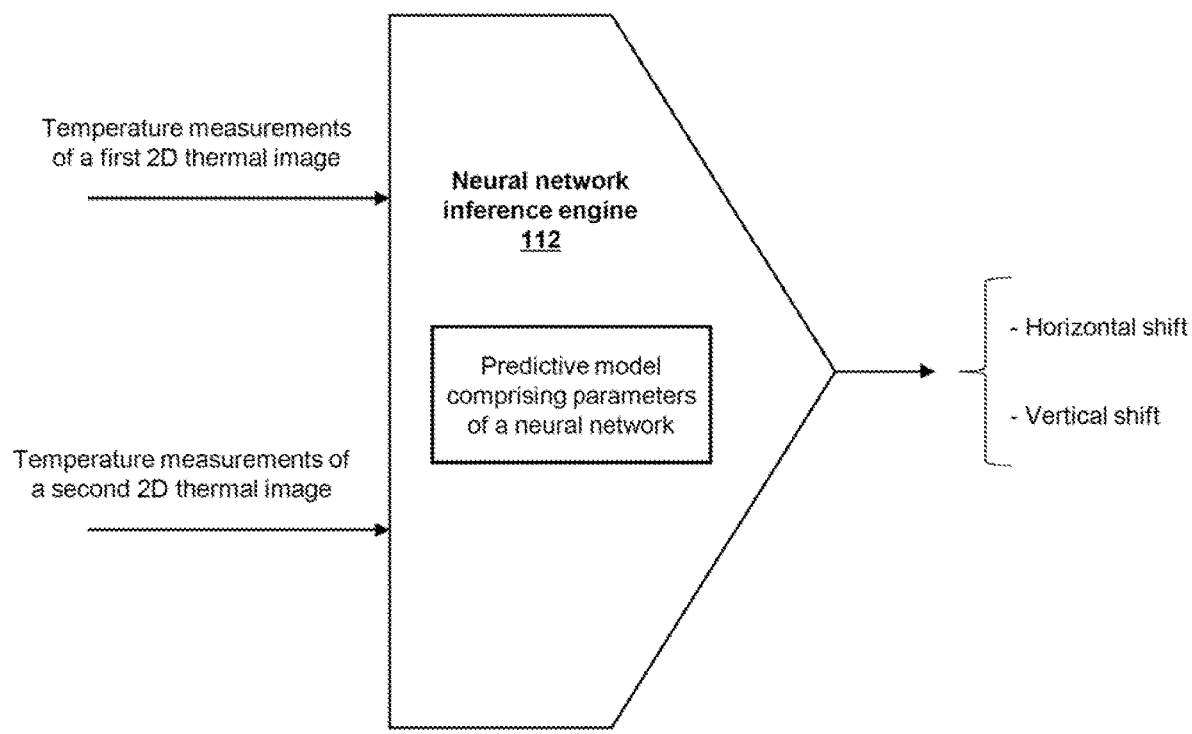
FIG. 7 is a schematic representation of a neural network inference engine executed by the computing device of FIG. 1 according to the method of FIG. 6.

Referring to FIGS. 1, 6 and 7, a schematic representation of the neural network inference engine 112 is illustrated in FIG. 7, representing the inputs and the outputs used by the neural network inference engine 112 when performing step 635 of the method 600.

Referring to FIGS. 6, 7, 8A and 8B, exemplary detailed representations of the neural network implemented by the neural network inference engine 112 are illustrated.

As is well known in the art, the neural network includes an input layer for receiving the temperature measurements of the first and second 2D thermal images, one or more hidden layer, and an output layer for outputting the horizontal shift and the vertical shift.

Figure 8A:
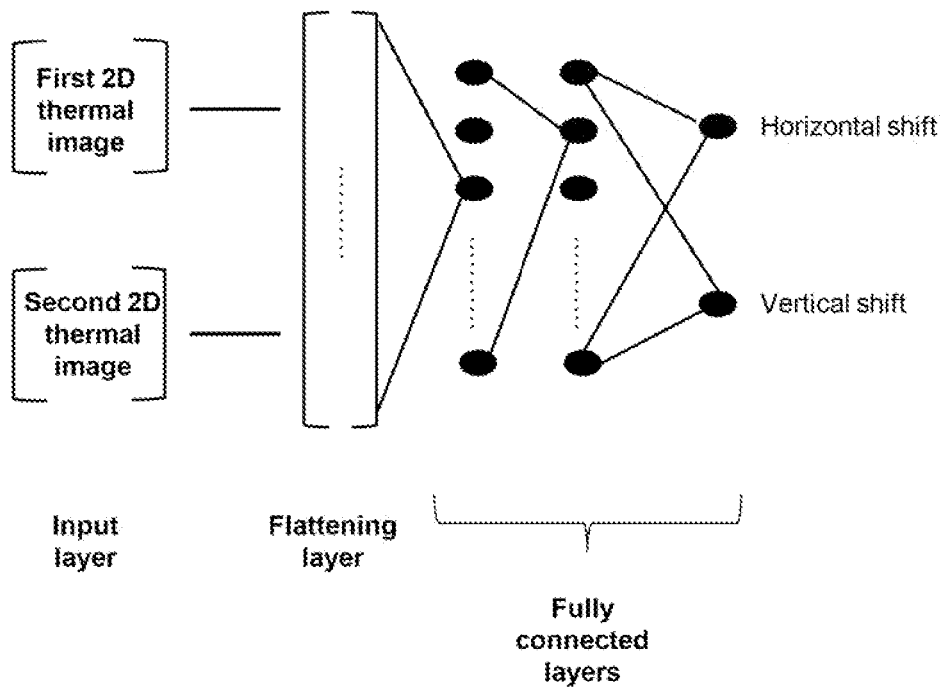
FIGS. 8A and 8B illustrate exemplary implementations of a neural network implemented by the neural network inference engine of FIG. 7.

In a first exemplary implementation illustrated in FIG. 8A, the neural network includes an input layer for receiving the temperature measurements of the first and second 2D thermal images, followed by a flattening layer, followed by a plurality of fully connect layers. The last layer among the plurality of fully connected layers is the output layer.

In general, neural networks used in the processing of images have a first layer adapted to receive array(s) of dimensions 2 or greater, representing the images. The flattening layer is adapted for converting the data of the image into a 1-dimensional array (also referred to as a vector) for inputting it to the next layer.

In this first exemplary implementation, the digital representation of the first and second 2D thermal images consists of respective first and second 2D arrays of temperature measurements (having M columns and N rows), as follows:

$$[T_{1,1} T_{2,1} \ldots T_{M,1}$$
$$T_{1,2} T_{2,2} \ldots T_{M,2}$$
$$\ldots$$
$$T_{1,N} T_{2,N} \ldots T_{M,N}]$$

The flattening layer comprises 2*M*N neurons, each neuron receiving one temperature measurement among the M*N temperature measurements of the first array and the M*N temperature measurements of the second array.

The flattening layer is followed by the plurality of fully connected layers. The operations of the fully connected layers are well known in the art. The number of fully connected layers is an integer greater than 1 (FIG. 8A represents three fully connected layers for illustration purposes only). The number of neurons in each fully connected layer may vary. During the training phase of the neural network, the number of fully connected layers and the number of neurons for each fully connected layer are selected, and may be adapted experimentally.

The last one among the plurality of fully connected layers is the output layer, which comprises one neuron for outputting the horizontal shift and one neuron for outputting the vertical shift.

In an alternative to the first exemplary implementation illustrated in FIG. 8A, the input layer receives a digital representation of the first and second 2D thermal images consisting of respective first and second vectors. The first vector comprises the M*N temperature measurements of the first 2D thermal image and the second vector comprises the M*N temperature measurements of the second 2D thermal image. In this case, the neural network does not include the flattening layer represented in FIG. 8A. The input layer comprises 2*M*N neurons connected to the first layer of the fully connected layers.

Figure 8B:
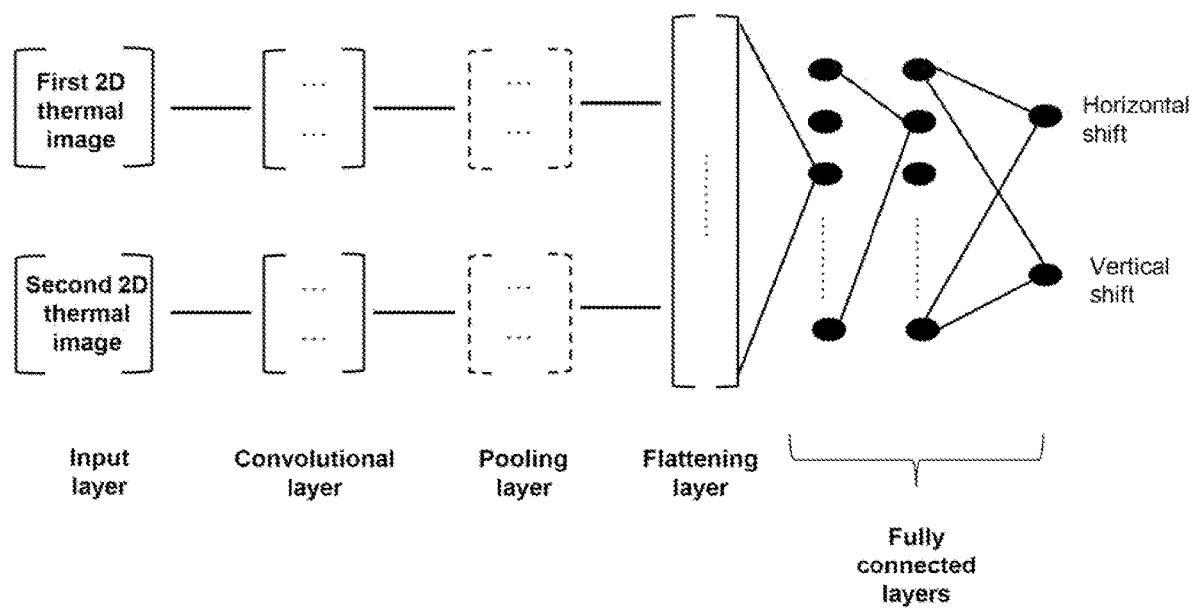

In a second exemplary implementation illustrated in FIG. 8B, the neural network includes an input layer for receiving the first and second 2D thermal images, followed by a convolutional layer, optionally followed by a pooling layer, followed by a flattening layer, followed by a plurality of fully connect layers. The last layer among the plurality of fully connected layers is the output layer.

A convolutional layer is well known in the art. The convolutional layer applies a convolution to an image to generate a convoluted image.

For each one of the first and second 2D thermal images respectively represented by a 2D array of temperature measurements having M columns and N rows, the convolutional layer applies a 2D convolution to generate corresponding first and second convoluted 2D arrays of temperature measurements. The 2D convolutional layer is defined by the following parameters: a two-dimensions filter and a stride. The first and second convoluted 2D arrays comprise M' columns and N' rows, with M greater or equal than M' and N greater or equal than N'.

The convolutional layer is optionally followed by a pooling layer. The output of the convolutional layer being two convoluted 2D arrays, the pooling layer generates two corresponding pooled 2D arrays. As is well known in the art, the pooling layer is defined by the following parameters: a two-dimensions filter, a stride and a pooling algorithm. The convoluted 2D arrays comprising M' columns and N' rows, the pooled 2D arrays comprise M" columns and N" rows, with M' greater than M" and N' greater than N". The role of the pooling layer is to reduce the size of the 2D arrays generated by the convolutional layer.

The convolutional layer (or the pooling layer if it is present) is followed by a flattening layer, which operates in a manner which has been previously described in relation to FIG. 8A. Each value of the two arrays generated by the convolutional layer (or the pooling layer if it is present) is allocated to a dedicated neuron of the flattening layer.

The flattening layer is followed by the plurality of fully connected layers, which operate in a manner which has been previously described in relation to FIG. 8A. In particular, the last one among the plurality of fully connected layers is the output layer, which comprises one neuron for outputting the horizontal shift and one neuron for outputting the vertical shift.

Although a single convolutional layer (and a corresponding optional pooling layer) is represented in FIG. 8B, several consecutive convolutional layers (and corresponding optional pooling layers) may be included in the neural network, as is well known in the art.

In still another implementation not represented in the Figures, a series of I consecutive first 2D thermal images received at step 625 of the method 600 and a series of I consecutive second 2D thermal images received at step 630 of the method 600, are used as inputs of the neural network at step 635 of the method 600. I is an integer greater or equal than 2. Thus, steps 625 and 630 are repeated I times before performing step 630. For example, if I is equal to 3, the neural network receives as inputs six 2D thermal images: three consecutive 2D thermal images generated by IR sensor 200 and three consecutive 2D thermal images generated by IR sensor 300. In this implementation, the IR sensors 200 and 300 need to have substantially the same frame rate. A person skilled in the art would readily adapt the neural networks illustrated in FIGS. 8A and 8B, to accept the series of I consecutive first and second 2D thermal images as inputs. With respect to FIG. 8A, the input layer and the flattening layer need to be adapted to process I*2 images, instead of only 2 images. The fully connected layers may also need to be adapted (e.g. increase the number of fully connected layers, increase the number of neurons of at least one of the fully connected layers, etc.). With respect to FIG. 8B, in addition to the adaptations mentioned with respect to FIG. 8A, the convolutional layer and optionally the pooling layer also need to be adapted to process I*2 images, instead of only 2 images. The horizontal and vertical shifts outputted by the neural network apply to the last image of the series of I consecutive first 2D thermal images received from the IR sensor 200 and the last image of the series of I consecutive second 2D thermal images received from the IR sensor 300. The predictive model of the neural network implemented by the neural network inference engine 112 is generated during a training phase during which series of consecutive first and second 2D thermal images are used as inputs for the training.

In yet another implementation not represented in the Figures, each of the first and second 2D thermal images are pre-processed by a first neural network configured to identify points of interest (referred to as interest points in the following). The outputs of the first neural network consist of locations of the interest points (e.g. the coordinates of the interest points) and descriptors of the interest points. The outputs of the first neural network (e.g. the coordinates of the interest points) are used as inputs of the second neural network implemented by the neural network inference engine 112 (instead of directly using the first and second 2D thermal images). The predictive model of the second neural network is generated during a training phase during which the interest points (e.g. the coordinates of the interest points) are used as inputs for the training A person skilled in the art would readily understand that the aforementioned implementations of the neural network are for illustration purposes only. Other implementations of the neural network may be used for achieving the functionalities of the method 600.

Training Procedure

Reference is now made concurrently to FIGS. 1, 3, 6 and 7. Following is a description of a procedure for training a neural network to perform localization of an overlap between two thermal images of two infrared sensors. The training procedure is implemented by the training server 400.

The training procedure is adapted to an implementation of the neural network supporting step 635 of the method 600 represented in FIG. 6. A person skilled in the art would readily adapt the training procedure to other implementations of the neural network mentioned previously (e.g. using series of images as inputs or interest points as inputs).

The processing unit 410 of the training server 400 executes the neural network training engine 411 and the control module 414. The neural network training engine 411 provides functionalities of a neural network, allowing to generate a predictive model ready to be used by the neural network inference engine 112 (executed by the computing device 100) at the end of the training, as is well known in the art. The control module 414 provides functionalities allowing the training server 400 to gather data used for the training of the neural network.

The training procedure comprises a step of initializing a predictive model used by the neural network implemented by the neural network training engine 411. This step is performed by the control module 414 executed by the processing unit 410 of the training server 400. The predictive model comprises various parameters which depend on the characteristics of the neural network implemented by the neural network training engine 411. The predictive model is stored in the memory 420 of the training server 400.

The initialization of the predictive model comprises defining a number of layers of the neural network, a functionality for each layer (e.g. convolutional layer, flattening layer, fully connected layer, etc.), initial values of parameters used for implementing the functionality of each layer, etc. The initialization of the predictive model is performed by a person highly skilled in the art of neural networks.

For example, the initialization of the parameters of a fully connected layer includes determining the number of neurons of the fully connected layer and determining an initial value for the weights of each neuron. Different algorithms (well documented in the art) can be used for allocating an initial value to the weights of each neuron. For example, each weight is allocated a random value within a given interval (e.g. a real number between −0.5 and +0.5), which can be adjusted if the random value is too close to a minimum value (e.g. −0.5) or too close to a maximum value (e.g. +0.5). In another example, the initialization of the parameters of a convolutional layer includes determining the size and values of the filter, and the value of the stride.

A comprehensive description of the initialization of the predictive model is out of the scope of the present disclosure, since it is well known in the art of neural networks and is different for each type of layer (e.g. a fully connected layer, a flattening layer, a convolutional layer, a pooling layer, etc.).

The data used for the initialization of the predictive model are received from a person via the user interface 440, and/or received from a remote computing device (not represented in FIG. 3) via the communication interface 430, and/or generated by a software program executed by the processing unit 410 (e.g. random generation of the initial value of the weights).

The training procedure comprises a step of generating training data. The training data comprise a plurality of first 2D thermal images generated by the IR sensor 200 and a corresponding plurality of second 2D thermal images generated by the IR sensor 300. For each pair of corresponding first and second 2D thermal images, a horizontal shift and a vertical shift are determined and included in the training data. The horizontal and vertical shifts define a translation of the second 2D thermal image with respect to the first 2D thermal image. The horizontal and vertical shifts determined during the training procedure correspond to the horizontal and vertical shifts generated at step 635 of the method 600 during the operational phase.

The IR sensors 200 and 300 used during the training procedure are positioned so that their respective image capturing visual fields overlap (as illustrated in FIGS. 4A and 4B), to generate the overlapping pairs of corresponding first and second 2D thermal images.

The IR sensors 200 and 300 are put in various operating conditions. For example, a reference object and/or reference person is positioned in the capturing visual fields of the IR sensors 200 and 300, and submitted to various conditions. For each particular condition, the IR sensors 200 and 300 pointing towards the reference object and/or reference person generate and transmit a pair of corresponding first and second 2D thermal images, which are received by the training server 400 via the communication interface 430.

In the case where one or more additional input value is used by the neural network, the one or more additional input value is also collected for each pair of corresponding first and second 2D thermal images and integrated to the training data.

In a first exemplary implementation, the values of the horizontal and vertical shifts for each pair of corresponding first and second 2D thermal images are determined by a human being who performs a visual analysis of the pair of corresponding first and second 2D thermal images, to identify the overlapping area between the pair of images. The human being may use image analysis software to assist in the identification of the overlapping area.

In a second exemplary implementation, the values of the horizontal and vertical shifts for each pair of corresponding first and second 2D thermal images are determined automatically, without assistance (or at least minimal assistance) of a human being. For instance, in addition to the IR thermal sensors 200 and 300, two visual light sensors (e.g. Red-Green-Blue (RGB) cameras) are used for generating a pair of 2D visual light images corresponding to the pair of 2D thermal images. A pattern recognizable by the visual light sensors is positioned in the overlapping image capturing visual field of the IR/visual light sensors. An image analysis software is used for automatically determining the position of the overlap between the pair of 2D visual light images (by recognizing the position of the pattern located at the overlap). The values of the horizontal and vertical shifts are deducted from the determined position of the overlap.

A person skilled in the art would readily understand that other implementations may be used for generating the training data.

The training procedure comprises a step (I) of executing the neural network training engine 411. The neural network training engine 411 implements the neural network using the predictive model for generating outputs based on inputs. The execution of the neural network training engine 411 is performed by the processing unit 410 of the training server 400.

The inputs comprise a given pair of corresponding first and second 2D thermal images selected among the training data. The outputs comprise an inferred horizontal shift and an inferred vertical shift. As mentioned previously, a given horizontal shift and a given vertical shift has been determined for this given pair of 2D thermal images during the generation of the training data.

The neural network implemented by the neural network training engine 411 corresponds to the neural network implemented by the neural network inference engine 112 (same number of layers, same functionality for each layer, same parameters used for implementing the functionality of each layer, etc.). As mentioned previously, FIGS. 8A and 8B are exemplary representations of such a neural network.

The training procedure comprises a step (II) of adjusting the predictive model of the neural network, to minimize a difference between the inferred horizontal and vertical shifts, and the given horizontal and vertical shifts associated to the given pair of 2D thermal images used as inputs of the neural network. This step is performed by the neural network training engine 411 executed by the processing unit 410 of the training server 400.

As is well known in the art, this step aims at minimizing a difference between outputs calculated by the neural network and expected outputs of the neural network, through the adjustment of the predictive model of the neural network (more specifically by adjusting parameters of the neural network comprised in the predictive model). For example, for a fully connected layer of the neural network, the adjustment comprises adjusting the weights associated to the neurons of the fully connected layer. In another example, for a convolutional layer of the neural network, the adjustment comprises adjusting the values of the filter used by the convolutional layer.

Various algorithms may be used for minimizing the difference between the calculated (inferred) outputs and the expected outputs. For example, the predictive model is adjusted so that a difference between the inferred horizontal shift and the given horizontal shift is lower than a threshold (e.g. a difference of only 1% is tolerated) and simultaneously a difference between the inferred vertical shift and the given vertical shift is lower than the threshold.

As is well known in the art, the steps (I) and (II) are repeated for several pairs of 2D thermal images selected among the training data. The training data need to be large enough to properly train the neural network.

The implementation of the training procedure with respect to steps (I) and (II) may vary. For example, batches of N tuples(s) are selected among the training data, N being an integer greater or equal than 1. Each tuple comprises a given pair of first and second 2D thermal images, and the associated horizontal and vertical shifts. Step (I) is performed for the N tuples(s) of a given batch. Step (II) is performed taking into consideration the N output(s) of the neural network calculated at step (I). Thus, the adjustment of the predictive model at step (II) is performed by taking into consideration the N tuple(s) simultaneously. This process is repeated for each batch of N tuple(s). At the end of the process, a new set of batches of N tuple(s) may be selected and the process repeated. The adjustments to the predictive model of the neural network performed at each iteration of step (II) are stored in the memory 420 of the training server 400.

The aforementioned steps of the training procedure correspond to step 605 of the method 600 represented in FIG. 6. At the end of the training procedure, the neural network is considered to be properly trained (the predictive model of the neural network has been adjusted so that a difference between the expected outputs and the calculated outputs has been sufficiently minimized). The predictive model, comprising the adjusted parameters of the neural network, is transmitted to the computing device 100, as illustrated by step 610 of the method 600 represented in FIG. 6. Test data are optionally used to validate the accuracy of the predictive model. The test data are different from the training data used for the training procedure.

Various techniques well known in the art of neural networks can be used for performing step (II). For example, the adjustment of the predictive model of the neural network at step (II) uses back propagation. Other techniques, such as the usage of bias in addition to the weights (bias and weights are generally collectively referred to as weights in the neural network terminology), reinforcement training, etc., may also be used.

In a particular implementation, the neural network training engine 411 and the neural network inference engine 112 are implemented by the same computing device 100. In this case, the steps of the training procedure and the steps of the method 600 (represented in FIG. 6) are performed by the same computing device 100 (the functionalities of the training server 400 are implemented by the computing device 100).

The training procedure may be implemented in two steps for a deployment at different customer premises. A generic predictive model is generated in a controlled training environment according to the aforementioned training procedure. At each specific customer premises, the generic predictive model is deployed, and a specific predictive model adapted to the characteristics of the specific customer premises is generated, by refining the generic predictive model. Ideally, the neural network automatically adjusts the generic predictive model and converges towards the adapted specific predictive model.

Fine-tuning of the generic predictive model into the specific predictive model can be achieved through reinforcement learning. As is well known in the art, a reinforcement signal is used for adapting the predictive model when reinforcement learning is implemented. The value of the reinforcement signal is one of positive reinforcement (also referred to as a positive reward) or negative reinforcement (also referred to as a negative reward).

Generalization of the Overlap Localization Procedure

Figure 9:
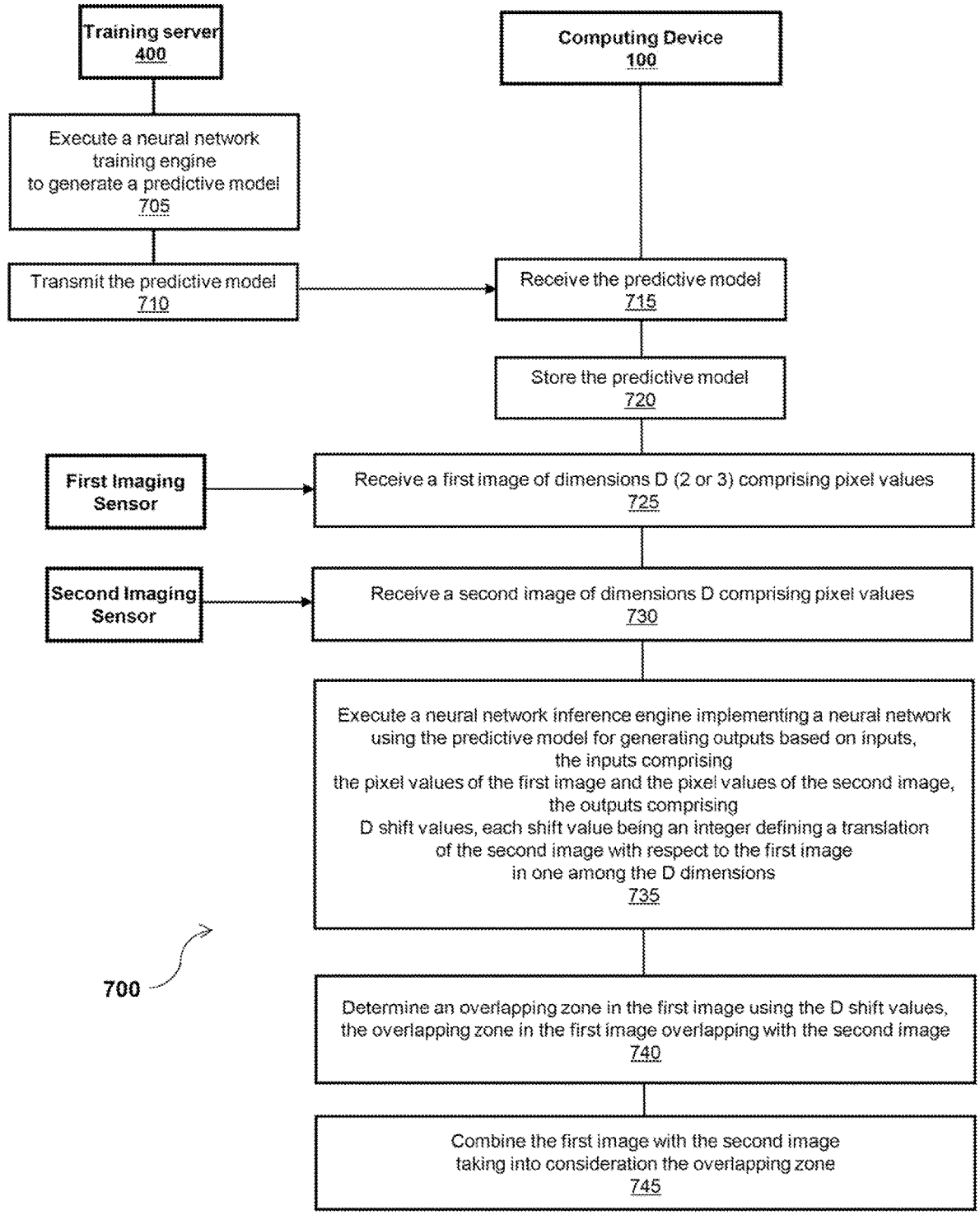
FIG. 9 illustrates a method implemented by the computing device of FIG. 1, using a neural network to localize an overlap between two images respectively generated by two imaging sensors.

Reference is now made concurrently to FIGS. 1, 2, 3, 6 and 9; where FIG. 9 represents a method 700 using a neural network to localize an overlap between two images respectively generated by two imaging sensors. The method 700 is a generalization of the method 600 represented in FIG. 6. The two imaging sensors generate images of dimensions D, D being equal to 2 or 3.

The type of image generated by the imaging sensors is not limited to a thermal image, but may include other types of images (e.g. a visual light image, etc.). The method 700 is applicable to a 2D or 3D image having one pixel value per pixel (e.g. the pixel value is a temperature measurement for a thermal image). For example, to apply the method 700 to a 2D or 3D Red-Green-Blue (RGB) image, the RGB image need to be pre-processed to calculate a single pixel value per pixel (e.g. by applying a pre-processing algorithm to the three RGB color components of each pixel).

In the following, the two imaging sensors will be referred to as the first imaging sensor and the second imaging sensor. They correspond to the IR sensors 200 and 300 represented in FIG. 1.

At least some of the steps of the method 700 are implemented by the computing device 100. The present disclosure is not limited to the method 700 being implemented by the computing device 100 represented in FIG. 1, but is applicable to any type of computing device capable of implementing the steps of the method 700.

A dedicated computer program has instructions for implementing at least some of the steps of the method 700. The instructions are comprised in a non-transitory computer program product (e.g. the memory 120) of the computing device 100. The instructions provide for using a neural network to localize an overlap between two images respectively generated by two imaging sensors, when executed by the processing unit 110 of the computing device 100. The instructions are deliverable to the computing device 100 via an electronically-readable media such as a storage media (e.g. CD-ROM, USB key, etc.), or via communication links (e.g. via a communication network through the communication interface 130).

The instructions of the dedicated computer program executed by the processing unit 110 implement the neural network inference engine 112 and the control module 114. The neural network inference engine 112 provides functionalities of a neural network, allowing to infer outputs based on inputs using the predictive model (generated by the training server 400), as is well known in the art. The control module 114 provides functionalities allowing the computing device 100 to interact with and control other devices (e.g. the first and second imaging sensors, the training server 400, etc.).

The method 700 comprises the step 705 of executing the neural network training engine 411 to generate a predictive model. Step 705 is performed by the processing unit 410 of the training server 400. The predictive model comprises parameters of a neural network implemented by the neural network training engine 411. Step 705 is similar to step 605 of the method 600.

The method 700 comprises the step 710 of transmitting the predictive model generated at step 705 to the computing device 100, via the communication interface 430 of the training server 400. Step 710 is performed by the processing unit 410 of the training server 400. Step 710 is similar to step 610 of the method 600.

The method 700 comprises the step 715 of receiving the predictive model from the training server 400, via the communication interface 130 of the computing device 100. Step 715 is performed by the processing unit 110 of the computing device 100. Step 715 is similar to step 615 of the method 600.

The method 700 comprises the step 720 of storing the predictive model in the memory 120 of the computing device 100. Step 720 is performed by the processing unit 110 of the computing device 100. Step 720 is similar to step 620 of the method 600.

The method 700 comprises the step 725 of receiving a first image of dimensions D (2 or 3) comprising pixel values from the first imaging sensor, via the communication interface 130 of the computing device 100. Step 725 is performed by the processing unit 110 of the computing device 100. 725 is similar to step 625 of the method 600.

The method 700 comprises the step 730 of receiving a second image also of dimensions D comprising pixel values from the second imaging sensor, via the communication interface 130 of the computing device 100. Step 730 is performed by the processing unit 110 of the computing device 100. 730 is similar to step 630 of the method 600.

Each dimension of the second image has the same size as the corresponding dimension of the first image. If D is equal to 2, the first and second images both comprise M columns and N rows. If D is equal to 3, the first and second images both comprise M columns and N rows, and a third dimension of size O.

An image capturing visual field of the second imaging sensor partially overlaps with an image capturing visual field of the first imaging sensor (as illustrated in FIGS. 4A and 4B for the IR sensors 200 and 300).

A digital representation of the first and second images may vary, based on a particular implementation of the first and second imaging sensors. In a previously mentioned implementation, the images transmitted by the first and second sensors to the computing device 100 are in the form of respective arrays of dimensions D comprising the pixel values. In another implementation, the data structure representative of the images is not in the form of an array of dimensions D. For example, the data structure is a vector comprising M*N entries when D is equal to 2 and M*N*O entries when D is equal to 3. The vector may be converted into an array of dimensions D by the processing unit 110.

The method 700 comprises the step 735 of executing the neural network inference engine 112. The neural network inference engine 112 implements a neural network using the predictive model (stored at step 720) for generating outputs based on inputs. The execution of the neural network inference engine 112 is performed by the processing unit 110 of the computing device 100. 735 is similar to step 635 of the method 600.

The inputs comprise the pixel values of the first image (received at step 725) and the pixel values of the second image (received at step 730). Optionally, the inputs also include additional input value(s) not represented in FIG. 9 for simplification purposes. During the training phase, the predictive model generated by the neural network training engine 411 takes into account the additional input value(s) if applicable.

The outputs comprise D shift values, each shift value being an integer defining a translation of the second image with respect to the first image in one among the D dimensions. If D is equal to 2, the 2 shift values consist of the previously mentioned horizontal shift $S_H$ and vertical shift $S_V$. If D is equal to 3, the 3 shift values consist of the previously mentioned horizontal shift $S_H$ and vertical shift $S_V$, and a shift $S_3$ in the third dimension.

The method 700 comprises the step 740 of determining an overlapping zone in the first image using the D shift values determined at step 735. The overlapping zone in the first image has a rectangular shape in the case where D is equal to 2 and a 3-dimensional shape (e.g. cube, prism, pyramid, etc.) in the case where D is equal to 3. The overlapping zone in the first image overlaps with the second image. Step 740 is performed by the processing unit 110 of the computing device 100. Step 740 is similar to step 640 of the method 600.

If D is equal to 2, the determination of the overlapping zone (area 500 having a rectangular shape) has been described previously in relation to FIGS. 5B-E. If D is equal to 3, a person skilled in the art would readily adapt the aforementioned determination of the overlapping zone of rectangular shape to the determination of the overlapping zone of 3-dimensional shape, by taking into consideration the shift $S_3$ in the third dimension.

The method 700 comprises the step 745 of combining the first image with the second image, taking into consideration the overlapping zone determined at step 740. Step 745 is performed by the processing unit 110 of the computing device 100. Step 745 is similar to step 645 of the method 600.

If D is equal to 2, two exemplary implementations of the combination of the first and second images, taking into consideration their overlapping zone (rectangular area 500), has been described previously in relation to FIGS. 4G-L. If D is equal to 3, a person skilled in the art would readily adapt the aforementioned combination of 2D images, taking into consideration their rectangular overlapping zone, to the combination of 3D images, taking into consideration their 3-dimensional overlapping zone.

Figure 10:
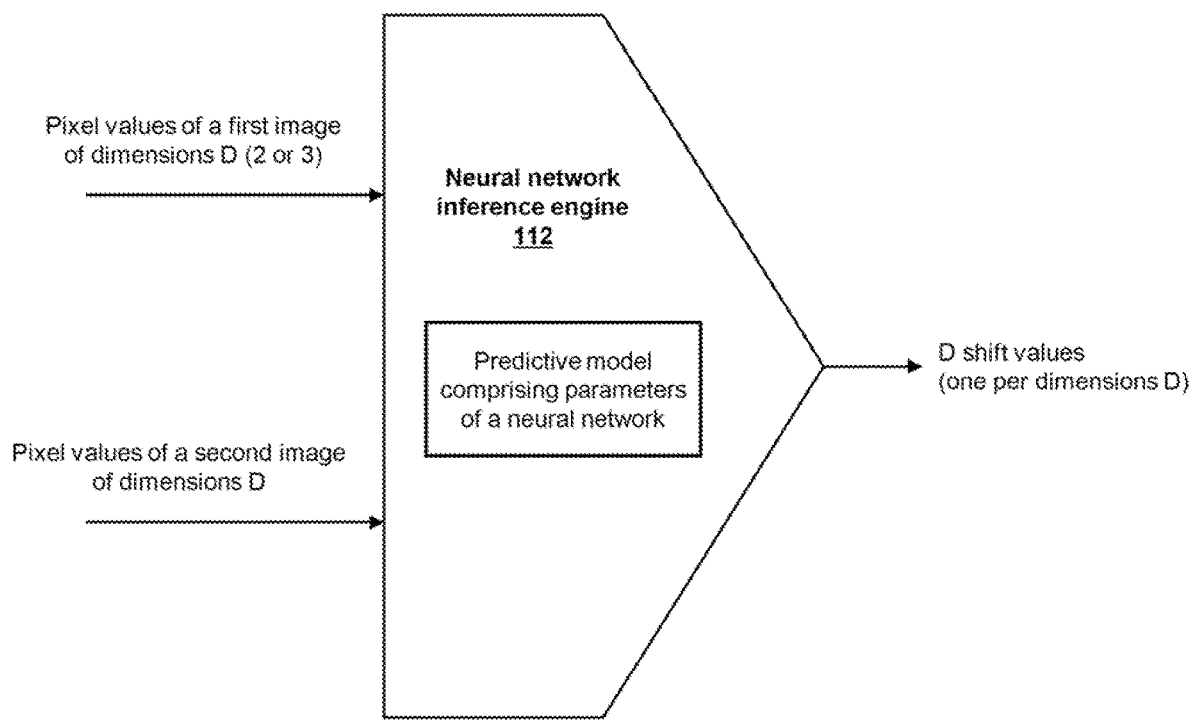
FIG. 10 is a schematic representation of a neural network inference engine executed by the computing device of FIG. 1 according to the method of FIG. 9.

Referring to FIGS. 1, 9 and 10, a schematic representation of the neural network inference engine 112 is illustrated in FIG. 10, representing the inputs and the outputs used by the neural network inference engine 112 when performing step 735 of the method 700.

A person skilled in the art would readily adapt the previously described examples (e.g. in FIGS. 8A and 8B) of the neural network implemented by the neural network inference engine 112 represented in FIG. 7, to the inputs and the outputs of the neural network inference engine 112 represented in FIG. 10.

A person skilled in the art would also readily adapt the previously described training procedure, adapted to the method 600 represented in FIG. 6 and to the neural network inference engine 112 represented in FIG. 7, to the method 700 represented in FIG. 9 and to the inputs and the outputs of the neural network inference engine 112 represented in FIG. 10.

Although the present disclosure has been described hereinabove by way of non-restrictive, illustrative embodiments thereof, these embodiments may be modified at will within the scope of the appended claims without departing from the spirit and nature of the present disclosure.

What is claimed is:

1. A method using a neural network to localize an overlap between two thermal images respectively generated by two infrared sensors, the method comprising:
   storing in a memory of a computing device a predictive model generated by a neural network training engine;
   receiving by a processing unit of the computing device via a communication interface of the computing device a first two-dimensional (2D) thermal image comprising temperature measurements from a first infrared (IR) sensor, the first 2D thermal image having M columns and N rows, M and N being integers;
   receiving by the processing unit via the communication interface a second 2D thermal image comprising temperature measurements from a second IR sensor, the second 2D thermal image also having M columns and N rows, an image capturing visual field of the second IR sensor partially overlapping with an image capturing visual field of the first IR sensor; and
   executing by the processing unit a neural network inference engine, the neural network inference engine implementing a neural network using the predictive model for generating outputs based on inputs, the inputs comprising the temperature measurements of the first 2D thermal image and the temperature measurements of the second 2D thermal image, the outputs comprising a horizontal shift $S_H$ and a vertical shift $S_V$, the horizontal and vertical shifts being integers, the horizontal and vertical shifts defining a translation of the second 2D thermal image with respect to the first 2D thermal image.

2. The method of claim 1, further comprising determining by the processing unit an overlapping area in the first 2D thermal image using the horizontal shift $S_H$ and the vertical shift $S_V$, the overlapping area in the first 2D thermal image having a rectangular shape and overlapping with the second 2D thermal image.

3. The method of claim 2, further comprising combining by the processing unit the first 2D thermal image with the second 2D thermal image, taking into consideration the overlapping area.

4. The method of claim 2, wherein the horizontal shift $S_H$ and the vertical shift $S_V$ are positive integers, and the overlapping area extends from column $S_H+1$ to column M and from row $S_V+1$ to row N.

5. The method of claim 2, wherein the horizontal shift $S_H$ is a positive integer and the vertical shift $S_V$ is a negative integer, and the overlapping area extends from column $S_H+1$ to column M and from row 1 to row $N+S_V$.

6. The method of claim 2, wherein the horizontal shift $S_H$ is a negative integer and the vertical shift $S_V$ is a positive integer, and the overlapping area extends from column 1 to column $M+S_H$ and from row $S_V+1$ to row N.

7. The method of claim 2, wherein the horizontal shift $S_H$ and the vertical shift $S_V$ are negative integers, and the overlapping area extends from column 1 to column $M+S_H$ and from row 1 to row $N+S_V$.

8. The method of claim 1, wherein the neural network comprises a flattening layer, followed by a plurality of fully connected layers.

9. The method of claim 1, wherein the neural network comprises a convolutional layer, optionally followed by a pooling layer, followed by a flattening layer, followed by a plurality of fully connected layers.

10. The method of claim 1, wherein a series of I consecutive first 2D thermal images are received from the first IR sensor, I being an integer greater or equal than 2, a series of I consecutive second 2D thermal images are received from the second IR sensor, the inputs of the neural network include the series of I consecutive first 2D thermal images and the series of I consecutive second 2D thermal images, and the horizontal and vertical shifts define a translation of the last of the series of I consecutive second 2D thermal image with respect to the last of the series of I consecutive first 2D thermal image.

* * * * *